US011531940B2

(12) United States Patent
Gupta et al.

(10) Patent No.: US 11,531,940 B2
(45) Date of Patent: Dec. 20, 2022

(54) IMPLICIT STATUS TRACKING OF TASKS AND MANAGEMENT OF TASK REMINDERS BASED ON DEVICE SIGNALS

(71) Applicant: Microsoft Technology Licensing, LLC, Redmond, WA (US)

(72) Inventors: Rahul Gupta, Hyderabad (IN); Pradeep Kumar Reddy K, Hyderabad (IN); Bhavesh Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 642 days.

(21) Appl. No.: 15/717,486

(22) Filed: Sep. 27, 2017

(65) Prior Publication Data

US 2019/0095846 A1   Mar. 28, 2019

(51) Int. Cl.
G06Q 10/06 (2012.01)
G06N 20/00 (2019.01)
G06Q 10/10 (2012.01)

(52) U.S. Cl.
CPC ..... *G06Q 10/063114* (2013.01); *G06N 20/00* (2019.01); *G06Q 10/1097* (2013.01)

(58) Field of Classification Search
None
See application file for complete search history.

(56) References Cited

U.S. PATENT DOCUMENTS 8,375,320 B2   2/2013 Kotler et al.
9,288,616 B2   3/2016 Cherry et al.
9,378,456 B2   6/2016 White et al.
9,413,707 B2   8/2016 Roman et al.
2010/0198869 A1   8/2010 Kalaboukis et al.
(Continued)

FOREIGN PATENT DOCUMENTS

JP   2017142833 A   *   8/2017   ........... G06F 16/243
WO   2014197279 A1   12/2014

OTHER PUBLICATIONS

D. M. Sow, et al. Uncovering the to-dos hidden in your in-box, 2006, IBM Systems Journal, vol. 45, No. 4 (Year: 2006).*
(Continued)

*Primary Examiner* — Jerry O'Connor
*Assistant Examiner* — Matthew H Divelbiss
(74) *Attorney, Agent, or Firm* — Shook, Hardy & Bacon L.L.P.

(57) ABSTRACT

Computing device state or activity based task reminders and automatic tracking of statuses of task-related activities are provided. Users are enabled to create reminders that are triggered based on a device state of the user's device or activity signals from the operating system, an application, or a user file. The status of a task item can be inferred from signals collected from one or more sources. The signals provide information associated with tasks that the user performs in various life events. Machine learning, statistical analysis, behavioral analytics, and data mining techniques are applied to the signals, and the user's activities are mapped to task items that the user has created. An inferred status of a task activity can be shared with other systems, or can be used for a variety of functions (e.g., to automatically update the user's task list, or to remind the user of an uncompleted task item).

20 Claims, 14 Drawing Sheets

(56) References Cited

U.S. PATENT DOCUMENTS

| | | |
|---|---|---|
| 2010/0332280 A1 | 12/2010 | Bradley et al. |
| 2011/0154335 A1 | 6/2011 | Tuovinen |
| 2013/0275983 A1* | 10/2013 | Horvitz .................. G06F 9/461 |
| | | 718/100 |
| 2014/0136255 A1* | 5/2014 | Grabovski ..... G06Q 10/063114 |
| | | 705/7.14 |
| 2014/0173602 A1 | 6/2014 | Kikin-gil et al. |
| 2015/0066529 A1* | 3/2015 | Lattuca ................. G16H 40/20 |
| | | 705/2 |
| 2015/0142704 A1* | 5/2015 | London ................. G06Q 10/10 |
| | | 706/11 |
| 2016/0232327 A1 | 8/2016 | Windridge et al. |
| 2016/0349953 A1 | 12/2016 | Adler et al. |
| 2016/0358092 A1 | 12/2016 | Stolarz et al. |
| 2017/0193349 A1* | 7/2017 | Jothilingam ........... G06N 20/20 |

OTHER PUBLICATIONS

"International Search Report and Written Opinion Issued in PCT Application No. PCT/US2018/039224", dated Sep. 21, 2018, 12 Pages.

Office Action Issued in European Patent Application No. 18742642.4, dated May 7, 2021, 7 Pages.

* cited by examiner

IMPLICIT STATUS TRACKING OF TASKS AND MANAGEMENT OF TASK REMINDERS BASED ON DEVICE SIGNALS

BACKGROUND

Managing multiple tasks in a person's personal and professional life is a challenge that many individuals face. Individuals oftentimes use one or more task or to-do list tools, such as calendar applications or to-do list applications, set alarms, or use reminder capabilities provided via a computing device operating system, digital assistant, or application to try to remember to complete tasks. Current task or to-do list tools oftentimes offer synchronizing and scheduling options, notifications, and reminders.

Various current tools also allow individuals to set task reminders based on time (e.g., remind me to book movie tickets at 6:00 PM), location (e.g., remind me to buy milk when I leave the office), or based on an individual's interaction with a contact (e.g., remind me to talk about project X when Bill calls me), where a reminder notification is provided upon detection of a triggering event (e.g., the date, the time, the user's location, the user's interaction with a contact). However, there are times when an individual may want a task reminder notification to be triggered based on a computing device state, device activity, application activity, or file activity. For example, with an increased usage of portable computing devices (e.g., mobile phones, tablets), there has been an exponential growth in the number of applications present on users' computing devices. For example, users oftentimes install and use applications to complete various tasks from their scheduled personal and professional lives, and task items are being increasingly coupled with applications that a user has.

Further, current task or to-do list tools enable users to manually manage the statuses of task items (e.g., marking a task item as complete, dismissing a reminder notification without marking a status of the task, setting new reminders for existing task items). However, current task or to-do list tools do not provide automated intelligent tracking of statuses of task items. When a user is not diligent about managing the statuses of task items, the user's task list can become a conglomerate of relevant task items and task items that are no longer relevant or useful to the user. Accordingly, a user's task list oftentimes does not accurately reflect the actual statuses of task items. Further, when a user is unaware of the status of a task item, the user may have to engage in a time-consuming process of searching through documents or communications, sending communications to other individuals who may know the status, and the like.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer readable storage device for providing computing device state or activity based task reminders and automatic tracking of statuses of task-related activities. The system is able to use knowledge of various computing devices that a user uses and activity signals from the user's computing devices to trigger task reminders. In some examples, users are enabled to set a reminders according to operating system-based trigger events. In other examples, users are enabled to set a reminders according to application-based trigger events. In other examples, users are enabled to set a reminders according to file-based events. For example, aspects enable a user to set a task reminder based on a detected state of a computing device (e.g., remind me to send an email to Ann when I open by computer), device activity (e.g., remind me to call John when I use my mobile phone), application activity (e.g., remind me to book tickets when I open the browser), or file activity (e.g., remind me to add Mary to the subcommittee list when I open Subcommittee Members spreadsheet).

Further, the system is able to automatically learn and detect whether a task item or user activity for which a user has set a task reminder is complete. For example, the system learns about the status of a task item or activity from signals collected from one or more sources of user data, such as the user's location, communications, browsing history, web search history, application usage, device usage, etc. Contextual signals are collected that provide information associated with tasks that the user performs in various life events. Machine learning, statistical analysis, behavioral analytics, and data mining techniques are applied to collected signals, such that the user's activities can be mapped to task items that the user has created, thus enabling the system to automatically infer and track the statuses of activities that the user chooses to task or of which to be reminded. An inferred status of a task activity can be shared with other systems, or can be used for a variety of functions, such as to automatically update the user's task list (e.g., mark a task item as complete), to remind the user of an uncompleted task item, and the like.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process. The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
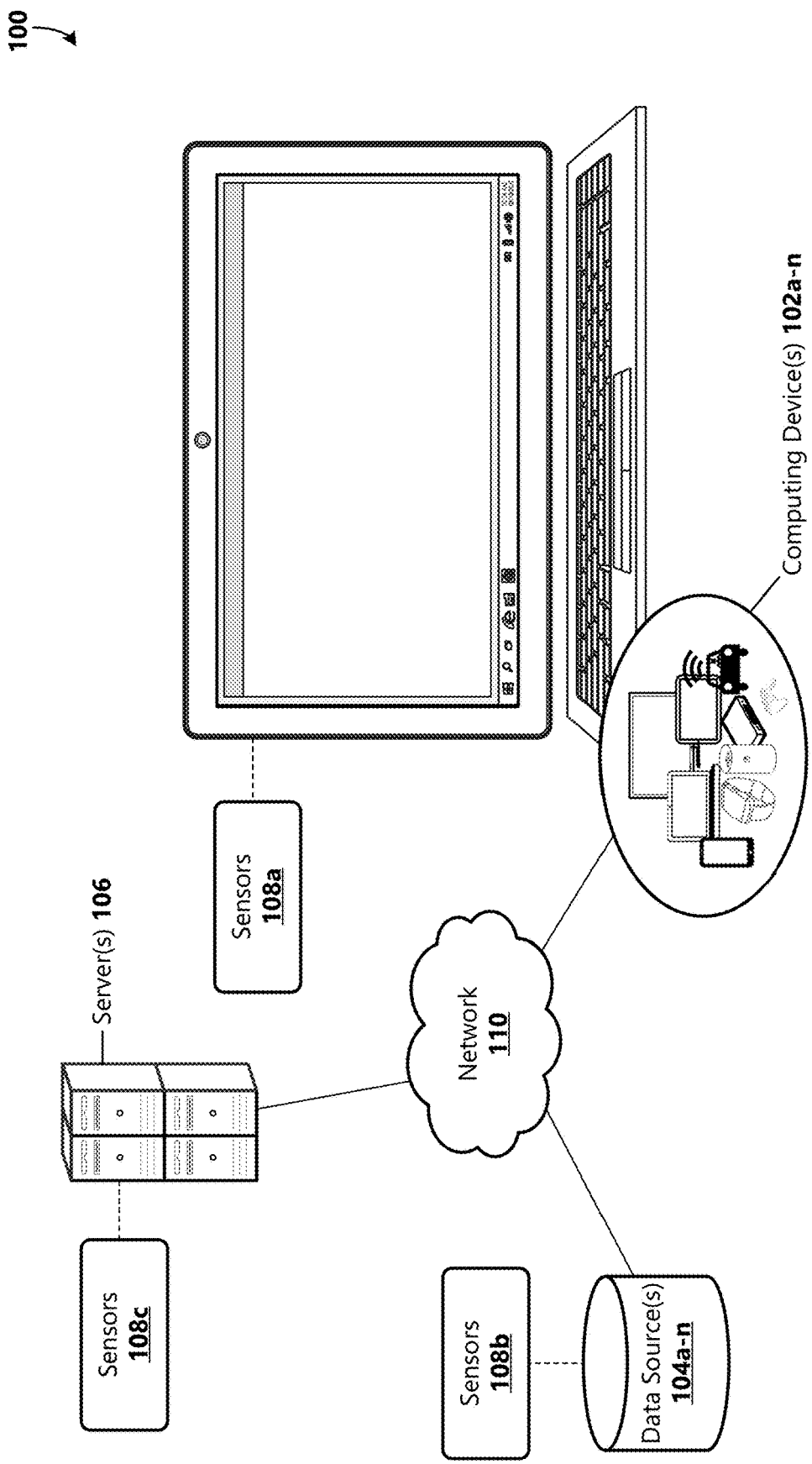
FIG. 1 is a block diagram showing an example operating environment for implementation of the present disclosure.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable storage device for providing computing device state or activity based task reminders and automatic tracking of statuses of task-related activities. Advantageously, the disclosed aspects enable the benefit of technical effects that include, but are not limited to, a reduced error rate and an improved user experience. For example, by providing automatic management of task items and reminders, users are provided with up-to-date task status information, which prevents users from having to make status queries or from having to manually mark the statuses of activities, which in some cases, are activities that users may not be aware of whether the activity has been completed. Further, users do not have to set reminders for tasks, but can be reminded about task-related activities when the statuses of tasks are determined to be complete, which enables more efficient user interaction. Additionally, by providing computing device state or activity based task reminders, users are provided with a variety of triggering options for reminders, which provides an improved user experience.

With reference now to FIG. 1, a block diagram is provided showing an example operating environment 100 in which aspects of the present disclosure can be employed. It should be understood that this and other arrangements described herein are provided as examples. Other arrangements and elements can be used in addition to or instead of those shown in FIG. 1. Various functions described herein as being performed by one or more elements or components can be carried out by hardware, firmware, and/or software. For example, some functions can be carried out by a processor executing instructions stored in memory. As illustrated, the example operating environment 100 includes one or more computing devices 102a-n (generally 102), a number of data sources 104a-n (generally 104), at least one server 106, sensors 108, and a network 110 or a combination of networks. Each of the components illustrated in FIG. 1 can be implemented via any type of computing device, such as the computing devices 600, 700, 805a,b,c described in reference to FIGS. 6, 7A, 7B, and 8. As an example, the one or more computing devices 102 can be one of various types of computing devices, such as tablet computing devices, desktop computers, mobile communication devices, laptop computers, laptop/tablet hybrid computing devices, large screen multi-touch displays, vehicle computing systems, gaming devices, smart televisions, wearable devices, internet of things (IoT) devices, etc.

The components can communicate with each other via a network 110, which can include, without limitation, one or more local area networks (LANs) or wide area networks (WANs). In some examples, the network 110 comprises the Internet and/or a cellular network, amongst any of a variety of possible public or private networks. As should be appreciated, any number of computing devices 102, data sources 104, and servers 106 can be employed within the example operating environment 100 within the scope of the present disclosure. Each can comprise a single device or a plurality of devices cooperating in a distributed environment. For example, the server 106 can be provided via multiple devices arranged in a distributed environment that collectively provide various functionalities described herein. In some examples, other components not shown can be included within the distributed operating environment 100.

According to an aspect, the one or more data sources 104 can comprise data sources or data systems that are configured to make data available to any of the various components of operating environment 100 or of the example systems 200, 225, 250, 275 described below with reference to FIGS. 2A, 2B, 2C, and 2D. In some examples, the one or more data sources 104 are discrete from the one or more computing devices 102 and the at least one server 106. In other examples, the one or more data sources 104 are incorporated or integrated into at least one of the computing devices 102 or servers 106.

The example operating environment 100 can be used to implement one or more of the components of the example systems 200, 225, 250, 275 described in FIGS. 2A, 2B, 2C, and 2D, including components for providing computing device state or activity based task reminders and automatic tracking of statuses of task-related activities. For example, aspects of the example system 200 bring together contextual information from user activity on the user's computing device(s) 102 to task items that the user has created (e.g., via an application 204 or via the digital personal assistant 206), applies reasoning on top of gathered signals, and creates a user context graph. Data associated with user activity can be related to entities mentioned in or related to task items, providing a capability for automatic tracking of statuses of activities that a user chooses to task. As another example, aspects of the example system 225 use device activity signals generated from a user's computing device 102 to understand various states the computing device goes through, and use the activity signals to trigger a reminder on a specific computing device. As another example, aspects of the example system 250 use activity signals generated from applications operating on a user's computing device 102 to understand the user's activities on the application, and use the activity signals to trigger a reminder on one or more computing devices. As another example, aspects of the example system 275 use activity signals generated from files on a user's computing device 102 or in the cloud to understand activities on the files, and use the activity signals to trigger a reminder on one or more computing devices. As another example, aspects of the example systems 200, 225, 250, 275 can be combined for using a combination of context data, computing device 102, application 204, and/or file activity signals to trigger a reminder on one or more computing devices (e.g., "remind me on my phone to check my oil ten minutes after I turn my car off at home;" "remind me to cancel my physical therapy appointment when I open Outlook® on my work computer;" "remind me to stop by the bank on Friday when I start my car").

Block diagrams are provided that show aspects of example computing system architectures, alone or in combination, suitable for implementing various aspects of the present disclosure. The systems 200, 225, 250, 275 represent only four examples of suitable computing system architectures. Other arrangements and elements can be used in addition to or instead of the elements shown. As should be appreciated, elements described herein are functional entities that can be implemented as discrete or distributed components, or in conjunction with other components, and in any suitable combination or location.

Figure 2A:
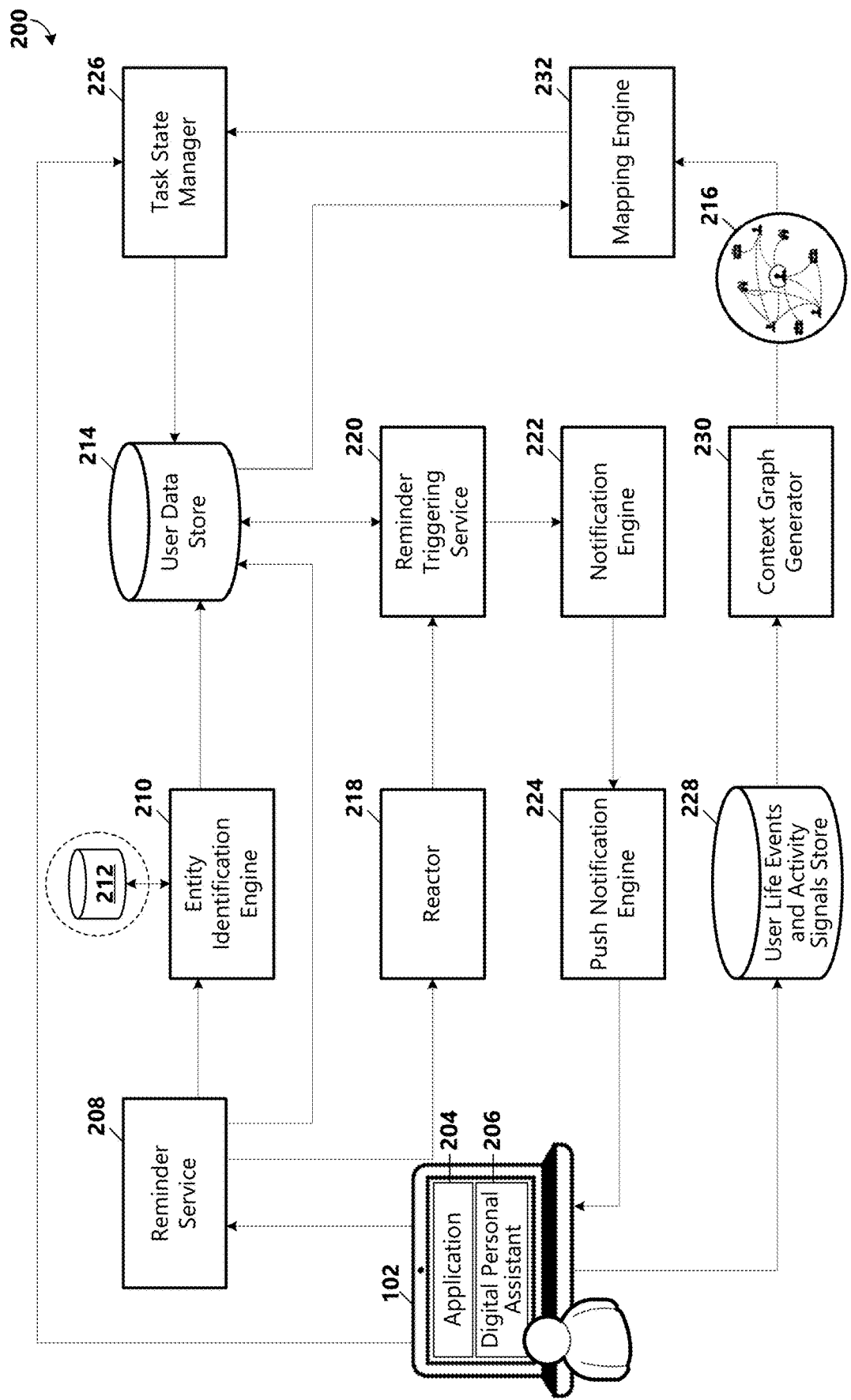
FIG. 2A is a block diagram showing an example computing architecture for implementing aspects of the present disclosure.

With reference now to FIG. 2A, the example system 200 includes a reminder service 208, an entity identification engine 210, a user data store 214, a reactor 218, a reminder triggering service 220, a notification engine 222, a push notification engine 224, a task state manager 226, a user life events and activity signals store 228, a context graph generator 230, and a mapping engine 232. The components of the example system 200 can operate on one or more computing devices 102, servers 106, can be distributed across one or more computing devices 102 and servers 106, or can be implemented in the cloud. In some examples, one or more of the components of the example system 200 are distributed across a network 110 or a combination of networks. In some examples, functions performed by components of the example system 200 are exposed via an API (Application Programming Interface).

In one example, functions performed by components of the example system 200 are associated with one or more applications 204 or a digital personal assistant 206. According to an aspect, a user is enabled to use an application 204 or a digital personal assistant 206 to create a task item; wherein, as used herein, task items can include an items that are created for tracking a particular activity (i.e., a task-related activity) until completion or can include items that are flagged for follow-up. Task items can include explicit task items and implicit task items. In some examples, an explicit task item can be created via a user selection of a new task item command, user input of a task item entry in a to-do or task list, assignment of a task item to another individual, sharing a task item with another individual, integrating a task list from another application 204 or service, input of task details (e.g., start date, due date, reminder information, priority, etc. According to an aspect, an implicit task item can be created via a user-selection to follow-up on an item (e.g., to-do item, note, e-mail message, contact) or via a detection of an action item in a communication, detection of a calendar item, etc.

In some examples, a task item is an item that is associated with a user task (e.g., pick up dry cleaning, call Bob, finish filing taxes). In other examples, a task item is an item that is associated with a computer-implemented task (e.g., set an alarm, send a message, perform a transaction). Task items can occur once or repeatedly. In some examples, a task item includes a reminder property. A task reminder can be enabled (e.g., user-selected or automatically) on a task item such that a task reminder is fired based on a trigger event (e.g., at a user-set or automatically-set date or time, the user's location, communication with a contact, application 204 usage, computing device 102 usage, file activity). For example, a task reminder can be enabled on a task item to remind a user to start a task, to remind a user about a completion milestone for the task item, or to remind a user when the task item is due. Aspects associated with triggering of a task reminder based on computing device 102 activity signals, application 204 activity signals, or file activity signals will be described in greater detail below with respect to FIGS. 2B, 2C, and 2D. The term "agent" can be used to generally describe a computing device 102, an application 204, or a user file in the context of triggering a task reminder based on activity signals from a computing device, application, or user file. For example, a task reminder can be based on agent activities.

According to an aspect, an application 204 or a digital personal assistant 206 can receive a user input from a user, such as a spoken utterance or input via a graphical user interface (GUI), wherein the user input is associated with creating a task item. In some examples, the application 204 is a thick client application, which is stored locally on the computing device 102. In other examples, the application 204 is a thin client application (i.e., web application) that resides on a remote server 106 and is accessible over a network 110 or a combination of networks. A thin client application can be hosted in a browser-controlled environment or coded in a browser-supported language and can rely on a common web browser to render the thin client application executable on the computing device 102. In other examples, the application 204 is a third-party application that is operative or configured to employ functions performed by components of the example system 200 via an API.

A user can use an application 204 on a computing device 102 for a variety of tasks, which can include, for example, to create task items. Other tasks that a user can use an application 204 for can include to write, calculate, draw, take and organize notes, organize and prepare presentations, search for and obtain information, send and receive electronic mail, make music, and the like. Examples of suitable applications 204 include, but are not limited to, calendar applications, reminder applications, to-do list applications, word processing applications, spreadsheet applications, slide presentation applications, electronic mail applications, drawing applications, note-taking applications, web browser applications, game applications, mobile applications, and the like. In some examples, an application 204 is operative or configured to generate and provide a GUI that allows a user to interact with application functionality and electronic content.

Digital personal assistant functionality can be provided as or by a stand-alone digital personal assistant application, part of an application 204, or part of an operating system of the computing device 102. In some examples, the digital personal assistant 206 employs a natural language user interface (UI) that can receive spoken utterances from a user that are processed with voice or speech recognition technology. For example, the natural language UI can include an internal or external microphone, camera, and various other types of sensors 108. The digital personal assistant 206 can support various functions, which can include interacting with a user (e.g., through the natural language UI or GUIs); performing tasks (e.g., making note of appointments in the user's calendar, sending messages and emails, providing reminders); providing services (e.g., answering questions from the user, mapping directions to a destination, other application or service functionalities that supported by the digital personal assistant 206); gathering information (e.g., finding information requested by the user about a book or movie, locating the nearest Italian restaurant); operating the computing device 102 (e.g., setting preferences, adjusting screen brightness, turning wireless connections on and off); and various other functions. The functions listed above are not intended to be exhaustive and other functions may be provided by the digital personal assistant 206. In examples, the applications 204 or digital personal assistant 206 can receive input from the user via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

With reference still to FIG. 2A, the reminder service 208 is illustrative of a software module, software package, system, or device operative or configured to receive a call from an application 204 or digital personal assistant 206 with a payload of task data. For example, when a task item is created (e.g., explicitly or implicitly) via an application 204 or a digital personal assistant 206, the task item and any corresponding parameter data (e.g., start date, due date, priority, reminder date, reminder time, location, contact names) are communicated to and received by the reminder service 208. For example, a user can explicitly create a new task item by speaking or typing a command such as "remind me to buy Gypsy Harper perfume when I am at the mall." The user can input additional parameters, such as a start date, a due date, priority level, a reminder date, a reminder time, location information, contact names, etc. Accordingly, the application 204 or digital personal assistant 206 that the user uses to input the command makes a call to the reminder service 208 with a payload of task data including data associated with the "remind me to buy Gypsy Harper perfume when I am at the mall" task item. The reminder service 208 is further operative to persist task data in a user data store 214 for later recall, wherein the user data store is an encrypted store of user data.

According to an aspect, the reminder service 208 is further operative or configured to make a call to the entity identification engine 210 to resolve entities present in the task data payload and to understand task reminder context. The entity identification engine 210 is illustrative of a software module, software package, system, or device operative or configured to detect entities and user tasks or activities associated with a task item or indicated in the task data. The term "entity," as used herein, describes any person, place, object, or thing about which there is or can be discrete, objective information available via data stored in one or more data stores. By way of example, and not limitation, an entity can include an individual, an organization, a location, a product, an activity, works, an event, a document, and the like. Further, the entity identification engine 210 can detect and extract entity values (e.g., URLs, email addresses, telephone numbers, addresses, currency amounts) mentioned in task item data. As an example, for the example "remind me to buy Gypsy Harper perfume when I am at the mall" task item mentioned above, the entity identification engine 210 can identify the entity "Gypsy Harper perfume" as an object or product, "mall" as a location, and "buy" as a user action.

In some examples, the entity identification engine 210 applies natural language processing and machine learning techniques to identify entities, entity properties, and entity relationships with other entities. Further, in some examples, the entity identification engine 210 makes a call to another data source 212, such as a search engine or a knowledge graph to resolve entities in a task data payload. For example, the knowledge graph represents entities and properties as nodes, and attributes and relationships between entities as edges, thus providing a structured schematic of entities and their properties and how they relate to the user. Accordingly, for a task item such as "take Pupcake to the vet," a knowledge graph can provide information that "Pupcake" is a dog and that "Pupcake" is connected to the user by an edge representing an owner/pet relationship; thus, an inference can be made that "Pupcake" is the user's dog.

Further, in some examples, the entity identification engine 210 is operative or configured to detect a reminder property (e.g., explicitly-defined parameter data, implicit reminder data) associated with a task item. According to an aspect, a task reminder can be a contextually-based task reminder, where a notification is provided to a user based on context information as identified by one or more signals (e.g., location, time, date, presence status, interaction with a contact, computing device 102 usage/state, application 204 usage, file activity). For example, a user can explicitly set a reminder for a task item based on when or where the user wants to be reminded (e.g., by inputting or selecting one or more reminder parameters), and accordingly, a notification can be provided to the user when a task item is due, when the user arrives or leaves a location, when the user's or another individual's presence status is available, when the user interacts with a particular contact, when the user uses a particular application 204, etc. For example, a user can ask a digital personal assistant 206: "Remind me to check the mail when I get home," wherein the task item is to check the mail, and a reminder parameter is location-based (e.g., the location of the user's home). According to an aspect, a task reminder can be provided as a push notification, an email message, a text message, or other type of notification or alert.

In some examples, a user can explicitly request to be reminded for a task item (e.g., "remind me to X") without explicitly defining reminder parameters (e.g., start date, a due date, a reminder date, a reminder time, location information, contact names, computing device 102 state or activity, application 204 activity, file activity). In such examples, the phrase "remind me to" can be identified and determined to be an explicit reminder property that indicates for a task reminder to be enabled in association with the task item. In other examples, a task reminder can be automatically applied to a task item. For example, a user can add a task item to a task list, such as "schedule a massage," and a reminder can be automatically applied and associated with the task item. That is, a notification can be provided to the user to remind the user to schedule a massage based on an inferred or predetermined parameter (e.g., after a specific amount of time, based on the user's schedule, based on the user's activity, based on application usage). According to an aspect, when explicit reminder properties are not provided, a reminder parameter can be designated for a task item, for example, based on a pre-set or default parameter value (e.g., in one hour, in one day, in one week). As an example, if an individual calls a user and the user cannot take the call and selects to be reminded to call the individual back, a reminder notification can be provided to the user one hour later based on a default time-based parameter value associated with a call back reminder.

According to another aspect, when explicit reminder properties are not provided, a reminder parameter can be inferred. For example, a reminder parameter can be inferred based on a variety of context information, such as entity-related information included in the task item, knowledge graph data, user histories, session logs, application data, contacts data, calendar and schedule data, notification data, social-network data, news (including popular or trending items on search engines or social networks), online gaming data, ecommerce activities, user-account(s) data (which can include data from user preferences or settings associated with an application 204 or a digital personal assistant 206), home-sensor data, appliance data, global positioning system (GPS) data, vehicle signal data, traffic data, weather data, wearable device data, network data, gyroscope data, accelerometer data, payment or credit card usage data, purchase history data, or other sensor data that may be sensed or otherwise detected by a sensor 108 (or other detector component(s)). According to an aspect, as used herein, the term "context information" describes any information characterizing a situation related to an entity or to an interaction between users, applications, or the surrounding environment. For example, for a task item such as "get milk," a task reminder can be automatically applied to the task item with an inferred reminder parameter of a grocery store location, such that a notification can be provided to the user when a determination is made that the user is at, near to, approaching, or will be passing by a location associated with a grocery store.

Upon resolving the entities associated with a task item and identifying task reminder parameters, the reminder service 208 is further operative or configured to subscribe to corresponding events with the reactor 218. For example, the reactor 218, illustrative of a software module, software package, system, or device, is operative or configured to provide and manage a publish/subscribe model for various events and to notify a corresponding subscriber when a change event happens based on one or more collected signals. According to an aspect, an event that is subscribed to in a publish/subscribe model is a trigger for a task reminder notification. For example, with reference to the above-mentioned task item example "remind me to buy Gypsy Harper perfume when I am at the mall," the mall is a location-based event that the reminder service 208 can subscribe to, such that when signals from the user's computing device 102 indicate that the user's location is at or near a mall location or that the user is traveling to a location where a mall is nearby or on the way, the event is published to the reactor 218, which triggers the reactor to notify all subscribers that the event has occurred.

According to an aspect, an observer for events corresponding to task item includes the reminder triggering service 220. The reminder triggering service 220 is illustrative of a software module, software package, system, or device operative or configured to manage the triggering of a task item reminder against a published event. For example, the reactor 218 is operative or configured to notify the reminder triggering service 220 that an event corresponding to a task item has occurred. Responsive to receiving the notification, the reminder triggering service 220 is operative or configured to fetch the task item data and any corresponding reminder data from the user data store 214, and send the event update, task item data, and reminder data to the notification engine 222. According to an aspect, the notification engine 222 is illustrative of a software module, software package, system, or device operative or configured to publish updates to a corresponding push notification engine 224. In some examples, the push notification engine 224 depends on the operating system of the computing device 102 on which the application 204 or the digital personal assistant 206 is running (e.g., Apple Push Notification service (APNs) is used for push notifications for an iOS device, Google® Cloud to Device Messaging (C2DM) is used for push notification for an Android™ device, Windows Push Notification Service (WNS) is used for push notifications for a Windows® OS). The push notification engine 224 is operative or configured to deliver the notification to the computing device 102, notifying the user of a task item or an action to be taken (e.g., buy Gypsy Harper perfume) based on the task item payload.

In some examples, explicit status tracking is provided. Based on an action that a user takes with a reminder notification, aspects of the example system 200 track the task item status (e.g., task item state, task reminder state). For example, when a user takes an action on a task reminder notification (e.g., selects snooze, marks a task item as complete), the reminder service 208 is operative or configured to receive a call with a corresponding payload, and to call the task state manager 226 to understand the user action and manage the state (e.g., completed, not completed, in process) of the task item.

In other examples, aspects of the example system 200 provide implicit task item status tracking. For example, a digital personal assistant 206 or in some examples, an application 204, can be present across all or a portion of a user's computing devices 102. Accordingly, the user's user life events and user activity can be known and understood from various signals the digital personal assistant 206 or application 204 collects, such as communications (e.g., emails, text messages, instant or chat messages), geo-location history, browsing history, web search history, application usage, device usage, file activity, etc. In some examples, signals are collected by one or more sensors 108 integrated with or communicatively attached to one or more computing devices, such as the one or more computing devices 102, servers 106, or data sources 104 illustrated in FIG. 1. The one or more sensors 108 can be embodied as hardware, software, or a combination of hardware and software operative or configured to sense, detect, or otherwise obtain various signals. By way of example and not limitation, signals can include data that are sensed or determined from the one or more sensors 108, such as location information of a computing device 102, properties or characteristics of the computing device(s) (such as device state, charging data, date/time, or other information derived from the computing device) and user interaction information (e.g., application usage; online activity; searches; voice data such as automatic speech recognition; activity logs; communications data including calls, texts, instant messages, and emails; website posts; and other user data associated with communication events). In some examples, user interaction information includes information associated with user interactions that occur over more than one computing device 102. User interaction information can further include user histories, session logs, application data, contacts data, calendar and schedule data, notification data, social-network data, news (including popular or trending items on search engines or social networks), online gaming data, ecommerce activities, user-account(s) data (which can include data from user preferences or settings associated with an application 204 or a digital personal assistant 206), home-sensor data, appliance data, global positioning system (GPS) data, vehicle signal data, traffic data, weather data, wearable device data, other user device data, which can include device settings, profiles, network-related information (e.g., network name or ID, domain information, workgroup information, connection data, wireless network data, or configuration data, data regarding the model number, firmware, or equipment, device pairings, or other network-related information), gyroscope data, accelerometer data, payment or credit card usage data, purchase history data, or other sensor data that may be sensed or otherwise detected by a sensor 108 (or other detector) component(s). For example, other sensor data can include data derived from a sensor 108 component associated with the user (including location, motion, orientation, position, user-access, user interactions, network-access, user device charging, or other data that is capable of being provided by one or more sensors), and other sources of data that can be sensed or determined as described herein.

As can be appreciated, the various signals from the user's computing devices 102, servers 106, or data sources 104 can convey a variety of useful information associated with the tasks that the user performs in various life events. According to an aspect, raw signals are collected and stored in the user life events and activity signals store 228, where they are accessible by the context graph generator 230. The context graph generator 230 is illustrative of a software module, software package, system, or device operative or configured to apply machine learning, statistical analysis, behavioral analytics, and data mining techniques to collected user signals to derive user task correlations and to generate a user context graph 216 for the user. For example, in the user context graph 216, entities are represented as nodes, and attributes and relationships between entities are represented as edges connecting the nodes. Thus, the user context graph 216 provides a structured schematic of entities and their relationships to other entities. According to an aspect, the user context graph 216 represents knowledge about a specific user in a structured manner. That is, the user context graph 216 represents at least a portion of a user's life through signals associated with the user. The knowledge captured in the user context graph 216 can include various aspects of a user's life including, for example, the user's user activities (e.g., travel, purchases, communications).

For example, consider that a user associated with the above-mentioned task item example "remind me to buy Gypsy Harper perfume when I am at the mall" goes to a shopping mall. Various signals (e.g., the user's geo-location, time and date information, network connection information, application usage, payment or credit card usage data, communication data) can be collected from the user's computing device 102 (e.g., the user's mobile phone) or from other devices (e.g., server 106, data source 104), analyzed, and are represented in the context graph 216 for enabling understanding of what the user has done or is doing. For example, collected signals can include location information of the user at a location associated with a mall during a specific time period on a specific date and a receipt emailed to the user comprising purchase information of Gypsy Harper perfume from a particular store in the mall during the specific time period on the specific date. The user's context graph 216 can include a relationship between the user and the mall at the specific date and time and a relationship between the user and Gypsy Harper perfume based on the collected and analyzed geo-location signals, time and date signals, and email receipt data. Accordingly, inferences can be made that the user was at a mall and purchased Gypsy Harper perfume while at the mall.

According to an aspect, the mapping engine 232, illustrative of a software module, software package, system, or device, is operative or configured to map user activities represented in the user context graph 216 with task item entities stored in the user data store 214 for inferring states (i.e., statuses) of task items. For example, based on one or more of various collected signals (e.g., a user's geo-location, communications, electronic receipts), the mapping engine 232 is operative to infer whether a task item or an activity associated with a task item reminder has been completed (e.g., an emailed receipt including a purchase of Gypsy Harper perfume from a store at a mall can indicate that the example user task item of "buy Gypsy Harper perfume when I am at the mall" has been completed). In some examples, the mapping engine 232 uses a machine learning algorithm to calculate scores for determining matches between user activities represented in the user context graph 216 and task item entities stored in the user data store 214. For example, the scores are numerical values indicative of the likelihoods that the user's activity(ies) are related to completing actions associated with task items, and thus are further indicative of the likelihoods that the task items have been completed.

According to an aspect, the mapping engine 232 is further operative or configured to pass the inferred task item state to the task state manager 226. The task state manager 226 is illustrative of a software module, software package, system, or device that is operative or configured to understand a user action and to manage the state of a corresponding task item. In some examples, the task state manager 226 persists the task item state (e.g., task status, user action status) in the user data store 214 where it can be used later for retrieval and for any further triggering of workflows. Based on an inferred task item state (e.g., determined status of a task item), a variety of workflows can be triggered.

For example, when a task item is determined to be completed based on inferring the task item state according to collected user activity and context signals, the inferred task item state can be communicated with the digital personal assistant 206, an application 204, or with a third-party system, for automatically updating the task list (e.g., remove the completed task item from the task list, marking the completed task item as complete), notifying the user or another individual that the task item has been completed (e.g., via notifying the reminder triggering service 220), etc. Further, the reminder service 208 can unsubscribe from corresponding task item-related events with the reactor 218. As another example, when the status of a task item is determined not to be complete, the reminder triggering service 220 can be notified for triggering a task item reminder to be sent to the user (e.g., via the notification engine 222 and push notification engine 224), or the inferred task item state can be communicated with the digital personal assistant 206, an application 204, or with a third-party system, for automatically updating the task list (e.g., prioritizing the task item in the task list).

Consider for example, the example task item "take Pupcake to the vet." Based on various collected signals (e.g., location data, calendar/scheduling data, communications data), a determination can be made that the user has not taken his dog Pupcake to a veterinarian or scheduled an appointment with a veterinarian, and thus an inference can be made that the task item has not been completed. Accordingly, the inferred task item state can be communicated to user (e.g., via the user's digital personal assistant 206, an application 204, or a third-party system). For example, a reminder associated with the task item can be re-triggered, a reminder notification can be spoken or displayed to the user to remind or notify the user that the task item has not yet been completed, or the task item can be prioritized in a task list (e.g., highlighted, moved to the top of the list).

As another example, consider that analysis and mapping of various collected signals indicate that the user has taken his dog Pupcake to a veterinarian (e.g., a veterinarian appointment on the user's calendar, an electronic receipt from a veterinarian office in the user's email inbox or text messages, geo-location of the user at a location associated with a veterinarian). Accordingly, an inference can be made that the task item has been completed. The task item can be removed from the user's task list or marked as complete. Further, the system 200 can stop tracking the task item. As can be appreciated, the example system 200 makes use of capabilities of the digital personal assistant 206, can bring together multiple staggered pieces of information, applies reasoning on top of the information, and attaches the reasoning to task items and associated task reminders to enable implicit task status tracking.

Figure 2B:
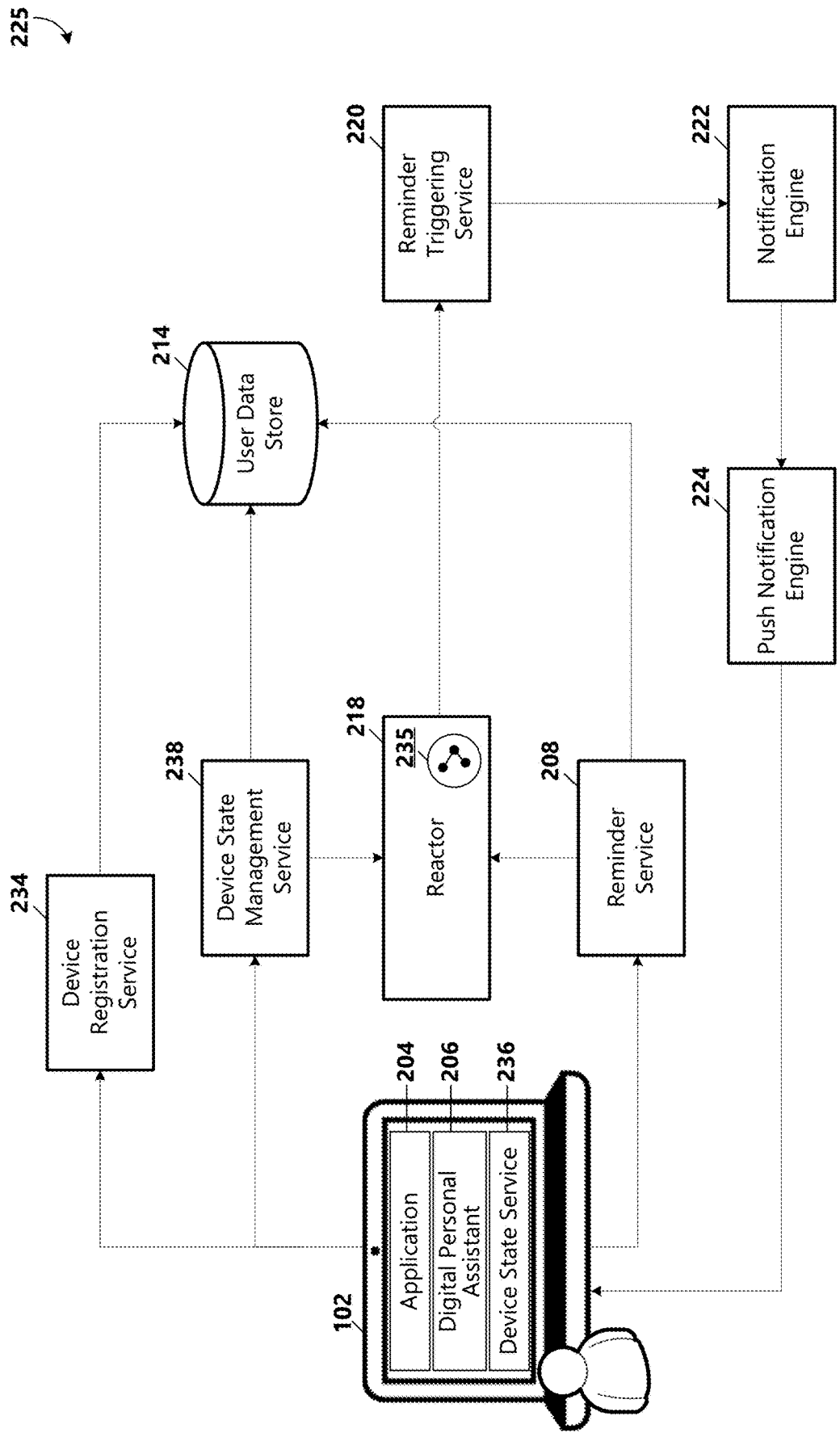
FIG. 2B is a block diagram showing another example computing architecture for implementing aspects of the present disclosure.

FIG. 2B is a block diagram of an example system 225 that includes components for providing operating system event-based task reminders. For example, an operating system event-based task reminder can include a reminder notification triggered by an operating system event, such as boot, open, active, close, sleep, shut down, etc. Some examples of operating system event-based task reminders include: "remind me to send an email to Sue when I open my Windows® PC;" "remind me to book tickets before I shut down my laptop;" "remind me to reset my mileage when I start my car;" or "remind me to call John when I use my Android® phone." For example, such task reminders are triggered when the user uses a computing device 102 associated with the user and activity signals are generated based on events coming from the computing device.

With reference now to FIG. 2B, the example system 225 includes the reminder service 208, a user data store 214, the reactor 218, the reminder triggering service 220, the notification engine 222, the push notification engine 224, a device registration service 234, a device state service 236, and a device state management service 238. The components of the example system 225 can operate on one or more computing devices 102, servers 106, can be distributed across one or more computing devices 102 and servers 106, or can be implemented in the cloud. In some examples, one or more of the components of the example system 225 are distributed across a network 110 or a combination of networks. In some examples, functions performed by components of the example system 225 are exposed via an API (Application Programming Interface).

According to an aspect, when a user installs a digital personal assistant 206 or signs in with an account for a digital personal assistant on any of the user's computing devices 102, the digital personal assistant registers the user's computing device with the device registration service 234. The device registration service 234 is illustrative of a software module, software package, system, or device that is operative or configured to make the computing device 102 uniquely identifiable amongst various computing devices that a user possesses or uses. For example, the device registration service 234 uses a user's user login identifier (ID) and computing device 102 hardware ID to create a unique parameter set for unique identification of the computing device. The unique parameter set enables the system 225 to correctly handle a new login (e.g., a different user) on the same computing device 102 or a user changing to a new computing device. In some examples, when a computing device 102 registers with the device registration service 234, attributes of the computing device can be retrieved from a directory to drive conditional access for authorizing issuance of security tokens for applications 204. According to an aspect, the user login IDs, computing device 102 hardware IDs, and unique parameter sets are stored in an encrypted user data store 214.

As stated above with reference to FIG. 2A, the reminder service 208 is illustrative of a software module, software package, system, or device operative or configured to receive a call from an application 204 or digital personal assistant 206 with a payload of task data. For example, when a task item is created (e.g., explicitly or implicitly) via an application 204 or a digital personal assistant 206, the task item and any corresponding parameter data (e.g., start date, due date, priority, reminder date, reminder time, location, contact names) are communicated to and received by the reminder service 208. In some examples, a task item includes parameter data that specify computing device 102 activity (e.g., boot event, open event, active event, close event, sleep event, shut down event) as a trigger point for a task reminder. In some examples, parameter data can further specify a particular computing device 102. For example, a user can create a new task item by speaking or typing a command such as "remind me to send an email to Sue when I open my Windows® PC." Upon detecting that the task item includes a device based reminder, the reminder service 208 stores the reminder-associated data in a user data store 214 such that it can be accessed at the time of triggering the task reminder.

According to an aspect, based on the data passed to the reminder service 208, the reminder service subscribes for corresponding computing device 102 events with the reactor 218. As described above with reference to the example system 200 illustrated in FIG. 2A, the reactor 218 is illustrative of a software module, software package, system, or device, and is operative or configured to provide and manage a publish/subscribe model for various computing device events and to notify a corresponding subscriber when a change event happens based on one or more collected signals. In some examples, the reactor 218 provides and manages a publish/subscribe model for a computing device graph 235 representing computing devices 102 that a user possesses or uses, and notifies corresponding subscribers when any change event happens on a corresponding computing device in the computing device graph. For example, the computing device graph 235 can be generated based on a user's known computing devices 102.

According to an aspect, an event that is subscribed to in a publish/subscribe model is a trigger for a task reminder notification. For example, with reference to the above-mentioned task item example "remind me to email Sue when I open my Windows® PC (personal computer)," opening the Windows® PC is a computing device operating system-based event that the reminder service 208 can subscribe to, such that when signals from the user's computing device 102 indicate that a Windows® PC computing device 102 associated with the user is opened, the event is published to the reactor 218, which triggers the reactor to notify all subscribers that the event has occurred.

Aspects of the example system 225 use events generated from a user's computing device(s) 102 to understand computing device activity and to use computing device events to remind the user about a task at a relevant time. When a new event is generated from a user's computing device 102 (e.g., a boot event on a personal computer), the device state service 236 on the user's computing device communicates the event over a network 110 or combination of networks to the device state management service 238 in the cloud. The device state management service 238 is illustrative of a software module, software package, system, or device, and is operative or configured to store event data associated with the user's computing device 102 in the user data store 214 and publish the event to the reactor 218 that manages data on all the subscribers of the corresponding computing device and device states. On receiving updates on corresponding entities, the reactor 218 is further operative or configured to notify the reminder triggering service 220 which manages the triggering of a task item reminder against the published event. For example, the reactor 218 is operative or configured to notify the reminder triggering service 220 that a computing device-related event corresponding to a task item reminder has occurred. Responsive to receiving the notification, the reminder triggering service 220 is operative or configured to fetch the task item data and any corresponding reminder data from the user data store 214, and send the event update, task item data, and reminder data to the notification engine 222.

As described above, the notification engine 222 is operative or configured to publish updates to a corresponding push notification engine 224, which in some examples, depends on the operating system of the computing device 102 on which the application 204 or the digital personal assistant 206 is running. The push notification engine 224 is operative or configured to deliver the notification to the computing device 102, notifying the user of a task item or an action to be taken (e.g., email Sue) based on the task item payload.

Figure 2C:
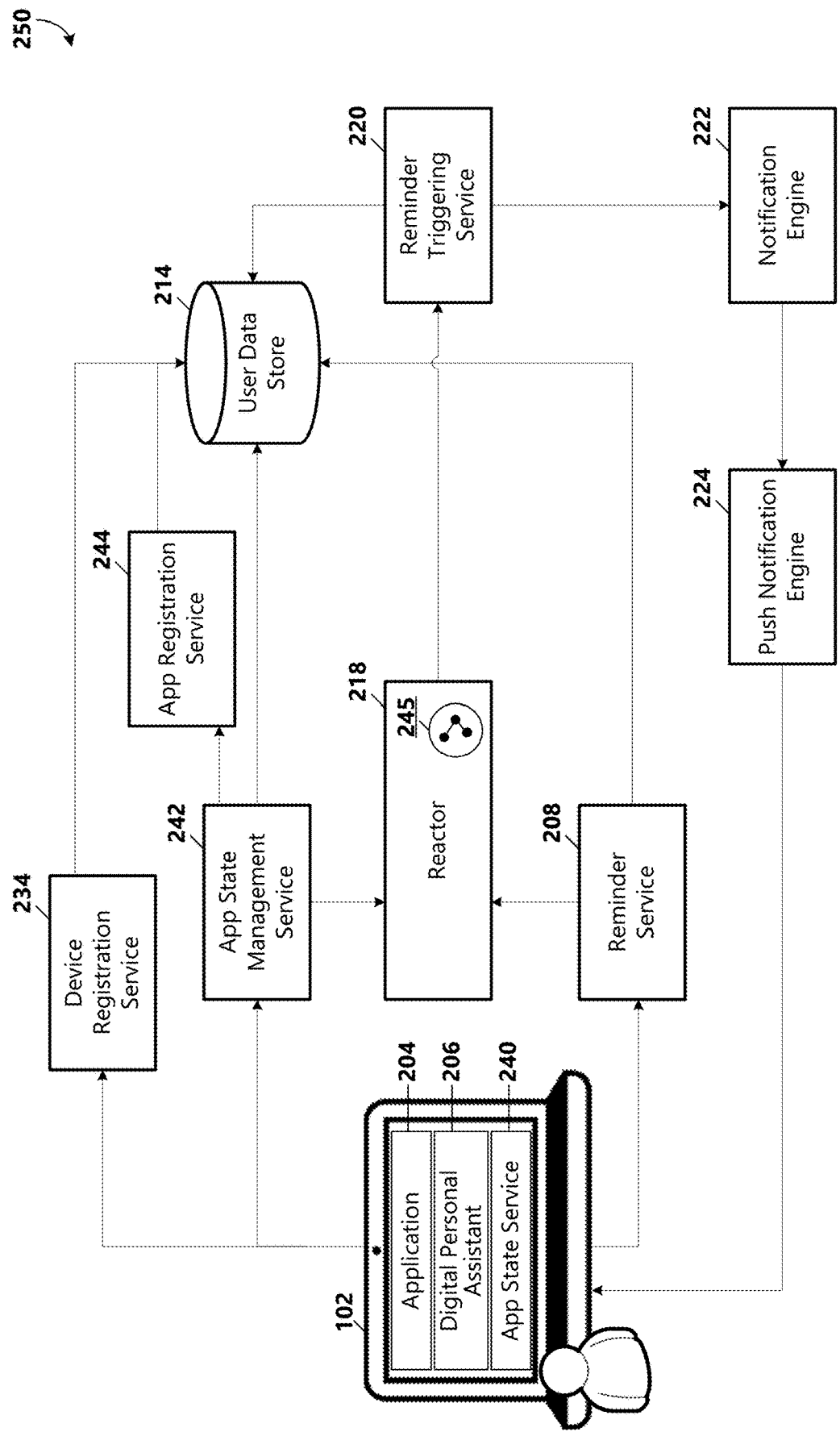
FIG. 2C is a block diagram showing another example computing architecture for implementing aspects of the present disclosure.

FIG. 2C is a block diagram of an example system 250 that includes components for providing application event-based task reminders. For example, like time-based reminders are triggered when a system clock hits a certain time and location-based reminders are triggered when a user crosses a geo-fence, application event-based reminders are triggered when a user opens an application 204 on his computing device 102, uses an application, closes an application, kills an application, uninstalls an application, etc. The trigger point for application event-based task reminders is an event coming from an application 204 installed on the user's computing device 102, and thus is dependent on an activity signal provided by the operating system of the computing device. Some examples of application event-based task reminders include: "remind me to book tickets when I open a browser;" "remind me to send Liz an email when I open Gmail™;" "remind me to buy Beethoven's Symphony No. 5 when I open iTunes®;" and "remind me to print September meeting agenda when I open Word." For example, such task reminders are triggered when the user opens or interacts with the corresponding applications 204 (e.g., a browser application, Gmail™, iTunes®, Microsoft® Word) on a computing device 102 associated with the user.

With reference now to FIG. 2C, the example system 250 includes the reminder service 208, a user data store 214, the reactor 218, the reminder triggering service 220, the notification engine 222, the push notification engine 224, the device registration service 234, an application state service 240, an application state management service 242, and an application registration service 244. The components of the example system 250 can operate on one or more computing devices 102, servers 106, can be distributed across one or more computing devices 102 and servers 106, or can be implemented in the cloud. In some examples, one or more of the components of the example system 250 are distributed across a network 110 or a combination of networks. In some examples, functions performed by components of the example system 250 are exposed via an API (Application Programming Interface).

As described above, when a user installs a digital personal assistant 206 or signs in with an account for a digital personal assistant on any of the user's computing devices 102, the digital personal assistant registers the user's computing device with the device registration service 234. With appropriate permissions taken from the user, this allows for knowledge of applications 204 on the user's computing devices 102 to be stored in the user data store 214. In some examples, explicitly mentioned computing device 102 nicknames can be identified or computing device nicknames can be implicitly detected using machine learning and stored in the user data store 214. Further, using the knowledge of the computing devices 102 owned or used by the user, conflation can be resolved, for example, when a same application 204 is present on multiple computing devices of the user. For example, a particular application 204, such as the mail application Apple® Mail, can be present on a user's PC and mobile phone. Accordingly, when an Apple® Mail-based reminder is created and the user opens Apple® Mail on any of his computing devices 102, a task reminder will be triggered by the system 250.

As described above with reference to FIGS. 2A and 2B, the reminder service 208 is illustrative of a software module, software package, system, or device operative or configured to receive a call from an application 204 or digital personal assistant 206 with a payload of task data comprising a task item and any corresponding parameter data. According to an aspect, in some examples, a task item includes parameter data that specify application 204 activity (e.g., open application, active usage of an application, close application, kill application, uninstall application) as a trigger point for a task reminder. In some examples, parameter data can further specify a particular application 204. For example, a user can create a new task item by speaking or typing a command such as "remind me to send Liz an email when I open Gmail™." Upon detecting that the task item includes an application event-based reminder, the reminder service 208 stores the reminder-associated data in a user data store 214 such that it can be accessed at the time of triggering the task reminder. According to an aspect, from any of a user's computing devices 102, a user is enabled to create task reminders on applications 204 present on any of the user's computing devices. In some examples, a user can specify a particular application 204 (e.g., "remind me to add Ann's name to the Committee Members List when I open Microsoft® Excel®"). In other examples, a user can specify a particular application 204 and a particular computing device 102 (e.g., "remind me to buy Beethoven's Symphony No. 5 when I open iTunes® on my iPhone®"). According to an aspect, users can specify a computing device 102 or an application 204 by an official name (e.g., Keynote®, PowerPoint®, Outlook®) or by a nickname (e.g., my phone, my laptop, map application, a game app, my browser).

According to an aspect, based on the data passed to the reminder service 208, the reminder service subscribes for corresponding application 204 events with the reactor 218. The reactor 218 is further operative or configured to provide and manage a publish/subscribe model for various application events and to notify a corresponding subscriber when a change event happens based on one or more collected signals. In some examples, the reactor 218 provides and manages a publish/subscribe model for a computing device-application graph 245 representing applications 204 and corresponding computing devices 102 that a user possesses or uses, and notifies corresponding subscribers when any change event happens on an application in the device-application graph. For example, the computing device-application graph 245 can be generated based on a user's known applications 204 and corresponding computing devices 102.

According to an aspect, an event that is subscribed to in a publish/subscribe model is a trigger for a task reminder notification. For example, with reference to the above-mentioned task item example "remind me to add Ann's name to the Committee Members List when I open Microsoft® Excel®", opening Microsoft® Excel® on a user's computing device 102 is an application-based event that the reminder service 208 can subscribe to, such that when signals from an application 204 on a user's computing device 102 indicate that the Microsoft® Excel® application is opened, the event is published to the reactor 218, which triggers the reactor to notify all subscribers that the event has occurred.

Aspects of the example system 250 use events generated from applications 204 to understand application activity and to use application events to remind users about tasks at relevant times. When a new event is generated from an application 204 (e.g., an open Outlook® event on a PC), the application state service 240 on the user's computing device 102 communicates the event over a network 110 or combination of networks to the application state management service 242 in the cloud. The application state management service 242 is illustrative of a software module, software package, system, or device, and is operative or configured to store event data associated with applications 204 on the user's computing devices 102 in the user data store 214 and to publish the event to the reactor 218 that manages data on all the subscribers of the corresponding computing device and device states. On receiving updates on corresponding entities, the reactor 218 is further operative or configured to notify the reminder triggering service 220 which manages the triggering of a task item reminder against the published event. For example, the reactor 218 is operative or configured to notify the reminder triggering service 220 that an application-related event corresponding to a task item reminder has occurred.

Responsive to receiving the notification, the reminder triggering service 220 is operative or configured to fetch the task item data and any corresponding reminder data from the user data store 214, and send the event update, task item data, and reminder data to the notification engine 222. As described above, the notification engine 222 is operative or configured to publish updates to a corresponding push notification engine 224, which in some examples, depends on the operating system of the computing device 102 on which the application 204 or the digital personal assistant 206 is running. The push notification engine 224 is operative or configured to deliver the notification to the computing device 102, notifying the user of a task item or an action to be taken (e.g., add Ann's name to the Committee Members List) based on the task item payload.

Figure 2D:
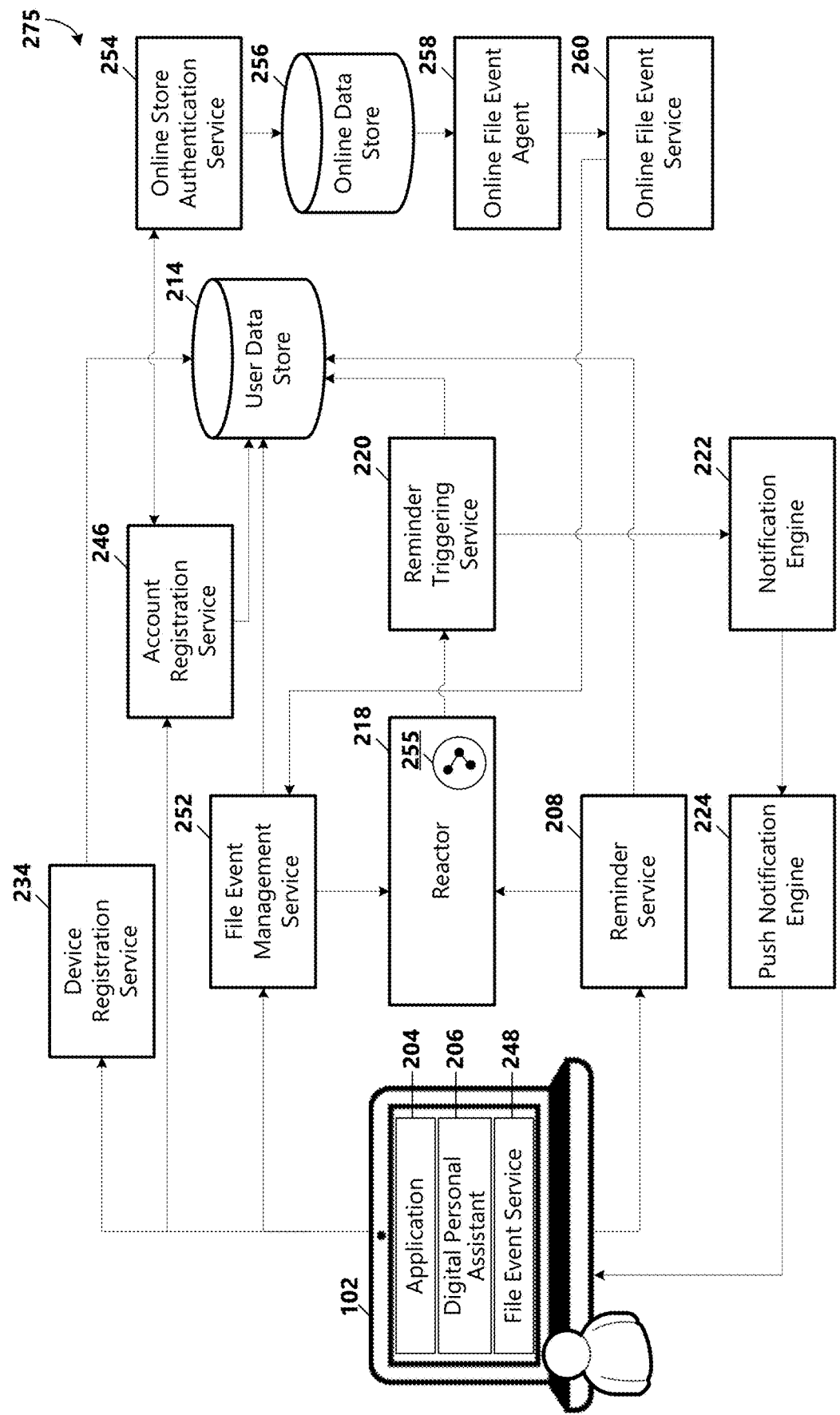
FIG. 2D is a block diagram showing another example computing architecture for implementing aspects of the present disclosure.

FIG. 2D is a block diagram of an example system 275 that includes components for providing file event-based task reminders. For example, a user is enabled to set task reminders based on file activity, wherein the trigger point for file activity-based task reminders are events communicated from the user's computing device 102 based on an action (e.g., open file, edit file, close file, delete file, move file) on a corresponding file stored in the cloud (e.g., on a server 106) or on the user's local machine. Some examples of file event-based task reminders include: "remind me to update project timelines when I open Project X OneNote®;" "remind me to remove the revenue numbers slide when I open XYZ Financial Data presentation;" "remind me to make a backup when I delete User Research Report from my PC." Aspects of the example system 275 use the knowledge about user files on different user computing devices 102 and shared files in the cloud to trigger task reminders.

With reference still to FIG. 2D, the example system 275 includes the reminder service 208, a user data store 214, the reactor 218, the reminder triggering service 220, the notification engine 222, the push notification engine 224, the device registration service 234, an account registration service 246, a file event service 248, a file event management service 252, one or more online store authentication service 254, one or more online data stores 256, an online file event agent 258, and an online file event service 260. The components of the example system 275 can operate on one or more computing devices 102, servers 106, can be distributed across one or more computing devices 102 and servers 106, or can be implemented in the cloud. In some examples, one or more of the components of the example system 275 are distributed across a network 110 or a combination of networks. In some examples, functions performed by components of the example system 275 are exposed via an API (Application Programming Interface).

According to an aspect, the example system 275 comprises an account registration service 246 for handling files stored on a server 106 in the cloud and a device registration service 234 for handling local files on a user's various computing devices 102. So that the system 275 can understand and develop knowledge on cloud stored files, a user can register one or more online data store 256 accounts with a corresponding account registration service 246, illustrative of a software module, software package, system, or device operative or configured to manage authentication of user credentials with the owner of user files. The online store authentication service 254 is illustrative of a software module, software package, system, or device operative or configured to send an authentication token to the Account Registration Service 246, which is used for future communications with the owner of user files (e.g., the online data store 256) regarding file events. According to an aspect, data stored in the online data store 256 is stored with the user data stored in the user data store 214.

As described above, when a user installs a digital personal assistant 206 or signs in with an account for a digital personal assistant on any of the user's computing devices 102, the digital personal assistant registers the user's computing device with the device registration service 234. With appropriate permissions taken from the user, this allows for knowledge of applications 204 on the user's computing devices 102 to be stored in the user data store 214. In some examples, explicitly mentioned computing device 102 nicknames can be identified or computing device nicknames can be implicitly detected using machine learning and stored in the user data store 214.

As described above with reference to FIGS. 2A, 2B, and 2C, the reminder service 208 is operative or configured to receive a call from an application 204 or digital personal assistant 206 with a payload of task data comprising a task item and any corresponding parameter data. According to an aspect, in some examples, a task item includes parameter data that specify file activity (e.g., open file, edit file, close file, delete file, move file) as a trigger point for a task reminder. In some examples, parameter data can further specify a particular application 204 and/or a particular computing device 102. For example, a user can create a new task item by speaking or typing a command such as "remind me to remove the revenue numbers slide when I open XYZ Financial Data presentation." Upon detecting that the task item includes a file event-based reminder, the reminder service 208 stores the reminder-associated data (e.g., reminder ID, reminder type, file name, file path, computing device ID) in a user data store 214 such that it can be accessed at the time of triggering the task reminder. According to an aspect, from any of a user's computing devices 102, a user is enabled to create task reminders on files present on any of the user's computing devices or in the cloud. In some examples, a user can specify a particular file (e.g., "remind me to update paragraph 5 when I open October Marketing Report"). In other examples, a user can specify a particular file and a particular application 204 (e.g., "remind me to run spellcheck when I open October Marketing Report in Word®"). In other examples, a user can specify a particular file, a particular application 204, and a particular computing device 102. According to an aspect, users can specify a file, a computing device 102, or an application 204 by an official name or by a nickname.

According to an aspect, based on the data passed to the reminder service 208, the reminder service subscribes for corresponding file events with the reactor 218. The reactor 218 is further operative or configured to provide and manage a publish/subscribe model for various file events and to notify a corresponding subscriber when a change event happens based on one or more collected signals. In some examples, the reactor 218 provides and manages a publish/subscribe model for a user file graph 255 representing files and corresponding computing devices 102 that a user possesses or uses, and notifies corresponding subscribers when any change event happens on a file in the user file graph. According to an aspect, an event that is subscribed to in a publish/subscribe model is a trigger for a task reminder notification. For example, the user file graph 255 can be generated based on the user's files stored locally on the user's computing device 102 and/or in one or more online data stores 256.

In some examples, when a new event is generated from a user file on the user's computing device 102, (e.g., open file XYZ Financial Data presentation on PC), the file event service 248, illustrative of a software module, software package, or system on the user's computing device (e.g., PC) is operative or configured to send the event to the file event management service 252 in the cloud. For task reminders on files stored in the online data store 256, the online data store is operative or configured to publish the file events to the online file event agent 258, which notifies the observers, such as the online file event service 260, on cloud file events. Responsive to receiving a notification of a cloud file event, the online file event service 260 is operative or configured to send the event to the file event management service 252 with corresponding parameters on the file and the file activity.

The file event management service 252 is illustrative of a software module, software package, system, or device, and is operative or configured to store event data associated with file activities in the user data store 214 and to publish the events to the reactor 218 that manages data on all the subscribers of the corresponding computing device and device states. On receiving updates on corresponding entities, the reactor 218 is further operative or configured to notify the reminder triggering service 220 which manages the triggering of a task item reminder against the published event. For example, the reactor 218 is operative or configured to notify the reminder triggering service 220 that a file activity-related event corresponding to a task item reminder has occurred.

Responsive to receiving the notification, the reminder triggering service 220 is operative or configured to fetch the task item data and any corresponding reminder data from the user data store 214, and send the event update, task item data, and reminder data to the notification engine 222. As described above, the notification engine 222 is operative or configured to publish updates to a corresponding push notification engine 224, which in some examples, depends on the operating system of the computing device 102 on which the application 204 or the digital personal assistant 206 is running. The push notification engine 224 is operative or configured to deliver the notification to the computing device 102, notifying the user of a task item or an action to be taken (e.g., remind me to remove the revenue numbers slide) based on the task item payload.

Figures 3A, 3B:
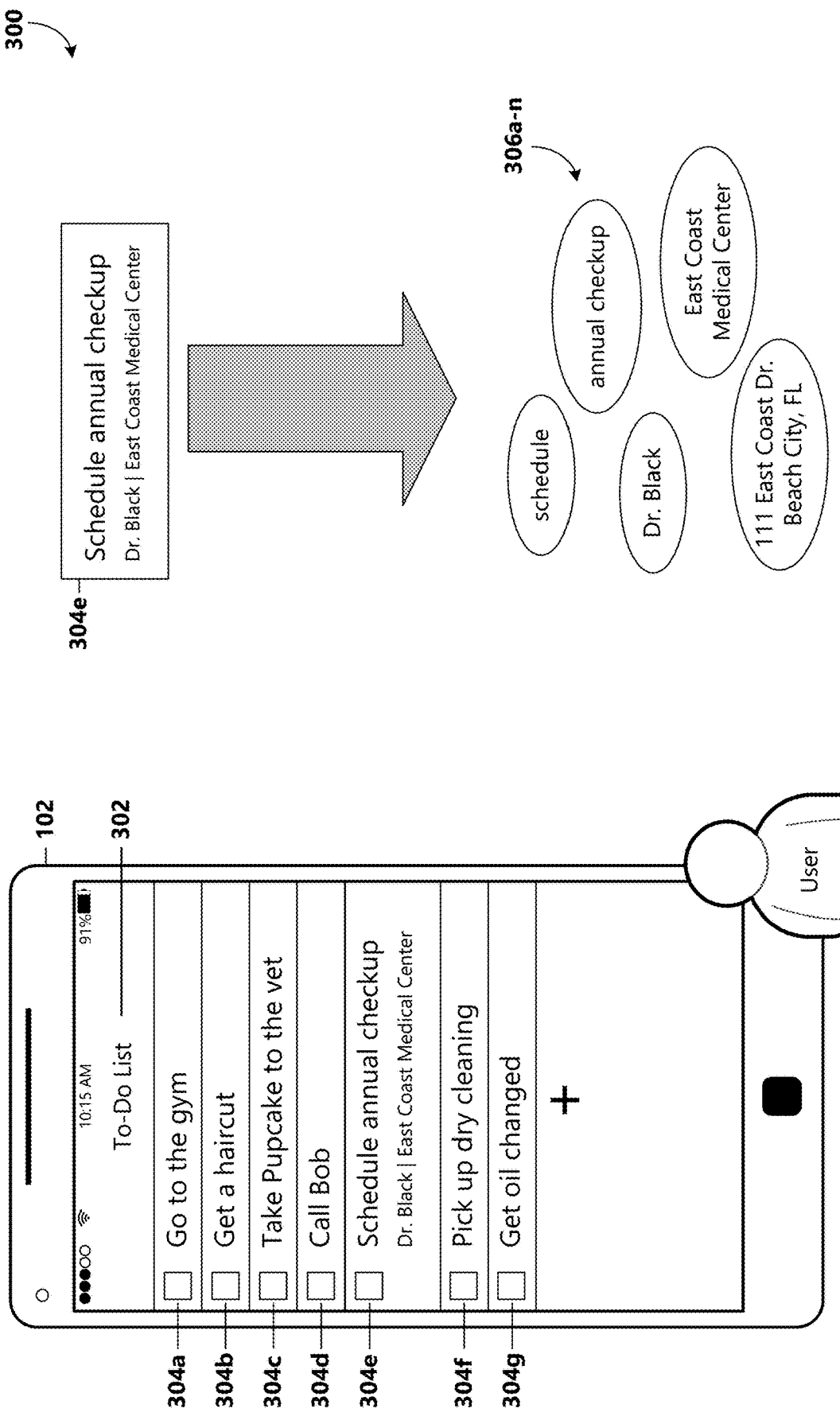
FIGS. 3A-3E illustrate an example use case scenario.

As should be appreciated, the block diagrams illustrated in FIGS. 2A-2D show aspects of example computing systems 200, 225, 250, 275 that can be implemented alone or in combination for implementing various aspects of the present disclosure. With reference now to FIGS. 3A-3E, an example use case scenario 300 is provided. As illustrated in FIG. 3A, a user is using a computing device 102 embodied as a mobile phone to view a to-do or task list 302 comprised of a plurality of task items 304a-g (generally 304). For example, the task list 302 can be provided by an application 204, a digital personal assistant 206, or a service. The task items 304 can be selectively created by the user, automatically created via a recognition of an action item (e.g., in an email, text message, voice communication), assigned to the user, shared with the user, imported from a service or third-party application, or otherwise added to the user's task list 302. In some examples, the user can select to enable implicit task item tracking for a task item 304. In other examples, implicit task item tracking is automatically applied to task items 304 in a task list 302.

With reference now to FIG. 3B, when a task item 304 is created or added to the user's task list 302, natural language processing and machine learning techniques are applied to the task item data to identify entities 306a-n (generally 306), entity properties, entity relationships with other entities, and user tasks or activities associated with the task item or indicated in the task item data. For example, entity extraction is performed on the example task item 304e "Schedule annual checkup," and a plurality of entities 306 are identified and stored in a user data store 214.

Figure 3D:
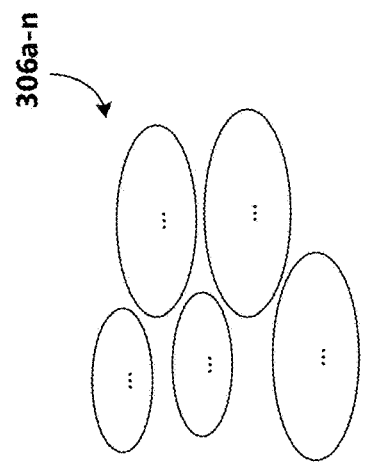
Figure 3C:
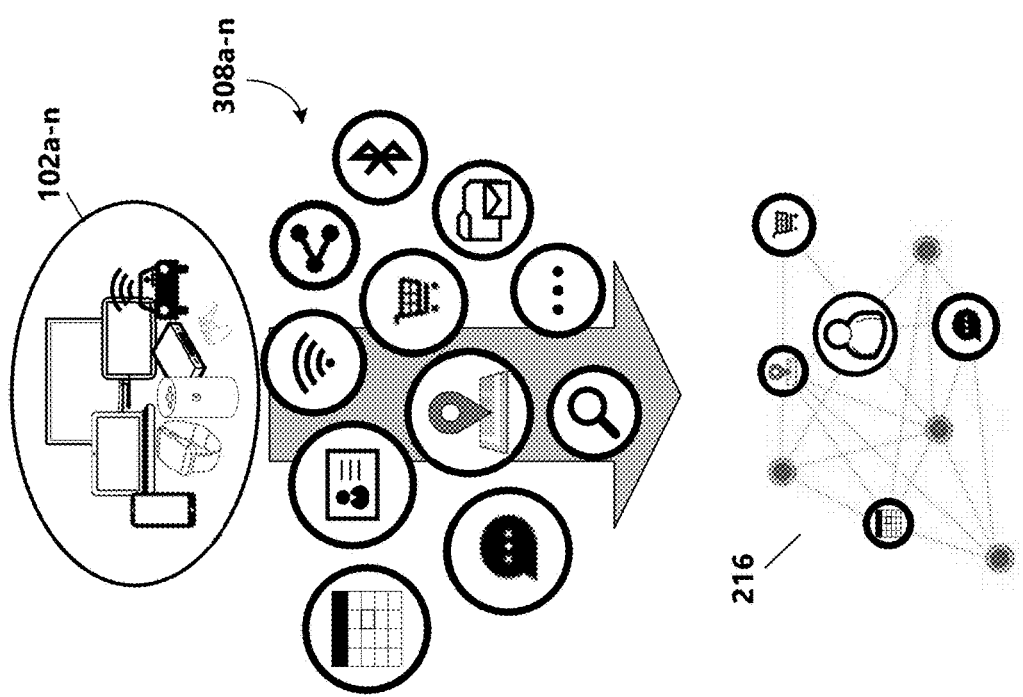

With reference now to FIG. 3C, various signals 308a-n (generally 308) are collected by one or more sensors 108 integrated with or communicatively attached to one or more computing devices, such as the one or more computing devices 102, servers 106, or data sources 104, are stored in a data store (e.g., the user life events and activity signals store 228), and are analyzed for capturing the user's activities (e.g., travel, purchases, communications) in a user context graph 216. The various signals 308 can include communications (e.g., emails, text messages, instant or chat messages), geo-location history, browsing history, web search history, application usage, device usage, calendar data, connection data, purchase data, social media data, contact data, etc. For example, the user context graph 216 can include data that captures a calendar item scheduled on the user's calendar for an annual checkup appointment that includes an address of the location of the appointment, a call made by the user to a phone number associated with a "Dr. Black" contact in the user's contacts list with date and time stamp, and a text message conversation between the user and a contact that includes a message from the user that states that she cannot meet the contact for lunch next Friday because of an annual checkup.

With reference now to FIG. 3D, the user activities represented in the user context graph 216 are mapped to the entities 306 identified in the user's task item 304e, and a state of the task item is inferred. For example, based on the collected signals 308, an inference can be made that the user has scheduled her annual checkup with her doctor and that the state of the task item 304e is complete.

Figure 3E:
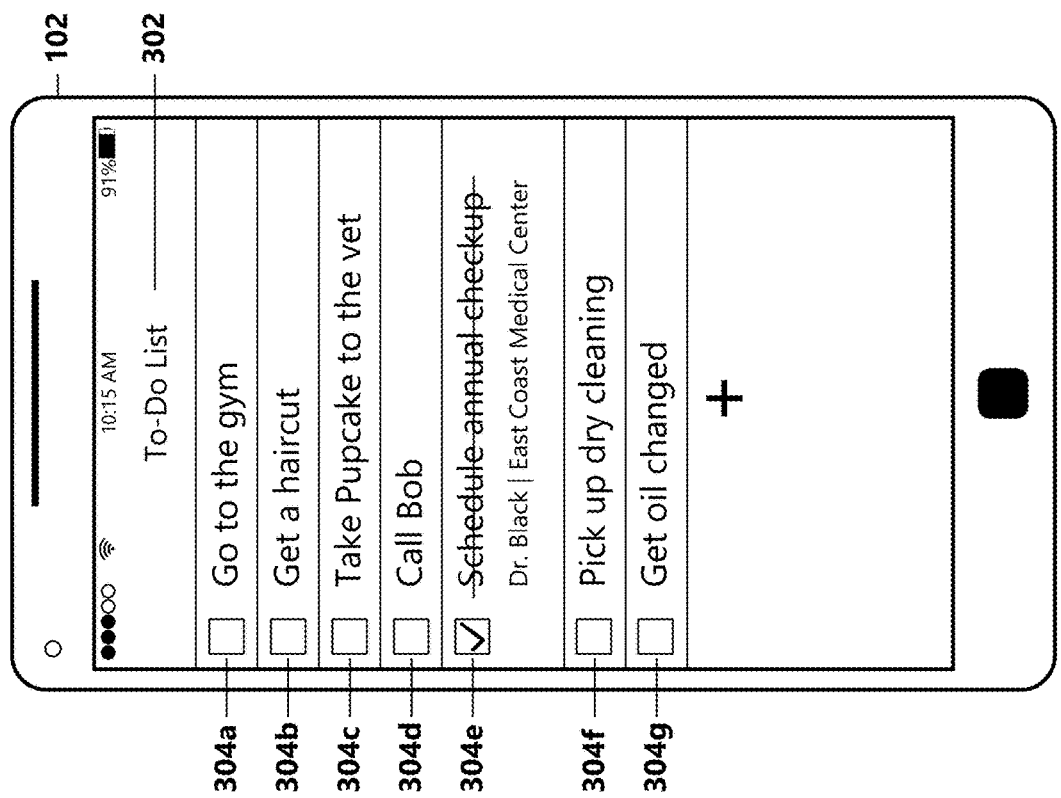

With reference now to FIG. 3E, the state of the task item 304e is persisted and can be used, for example, to update the user's task list 302. The user can open her task list 302 on a computing device 102 and based on the inferred state of the task item 304e, the status of the task item can be automatically updated. In the illustrated example, the task item 304e is marked as complete.

Figure 4:
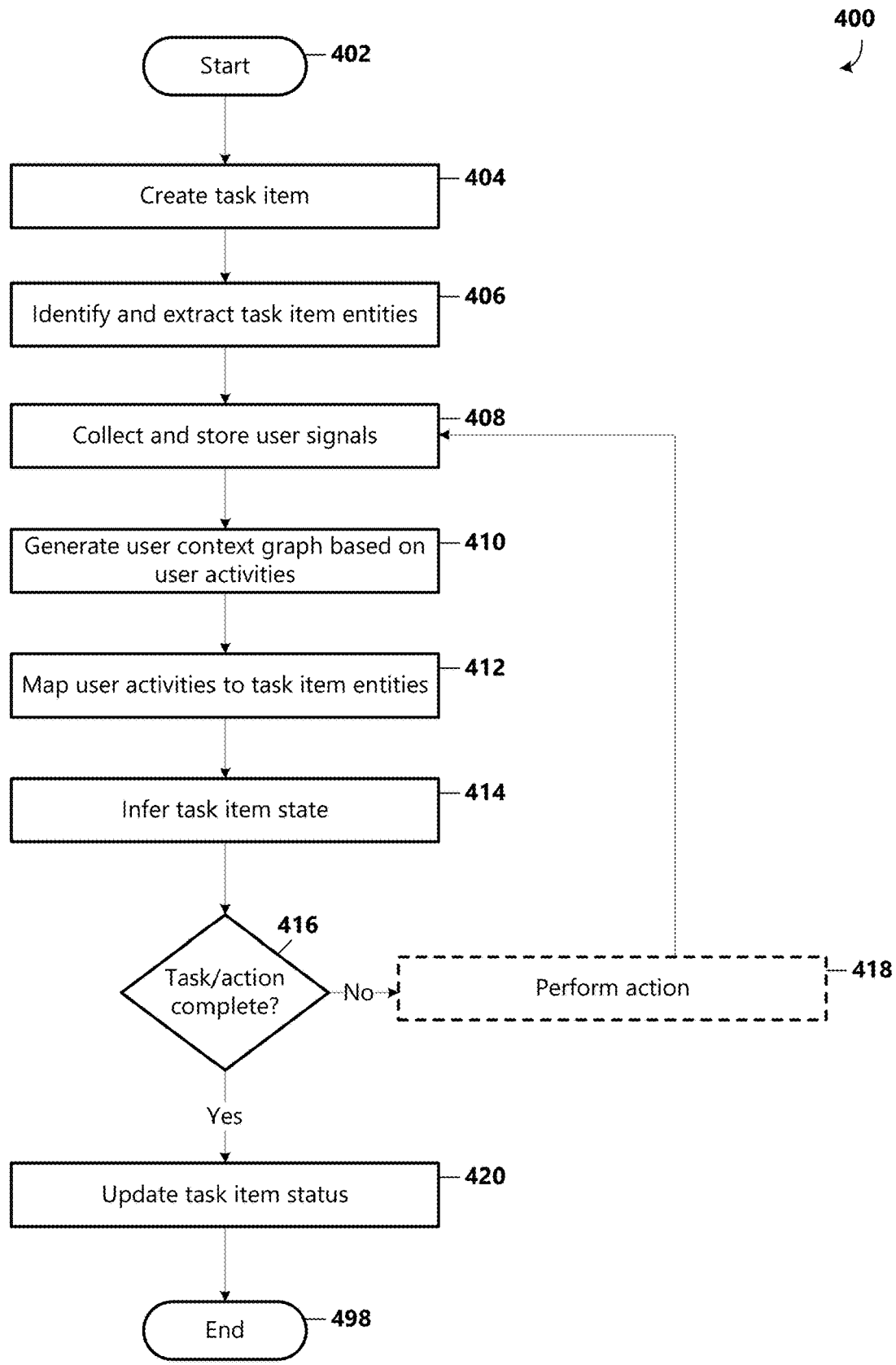
FIG. 4 is a flow chart showing general stages involved in an example method for providing automatic tracking of statuses of task-related activities.

Having described an operating environment 100, example systems 200, 225, 250, 275 and an example use case scenario 300 with respect to FIGS. 1, 2A-D, and 3A-3E, FIG. 4 is a flow chart showing general stages involved in an example method 400 for providing automatic tracking of statuses of task-related activities. With reference now to FIG. 4, the method 400 begins at start OPERATION 402, and proceeds to OPERATION 404, where a task item 304 is created via a service, an application 204 or a digital personal assistant 206 operating on a computing device 102. Further, a payload of task item 304 data is sent to the reminder service 208. In some examples, the task item 304 is a user activity for which a task reminder is set.

The method 400 proceeds to OPERATION 406, where natural language processing and machine learning techniques are applied to the task item 304 data for identifying entities 306, related entities, and attributes on those entities. Identified entities and attributes are extracted and stored in a user data store 214. The method 400 continues to OPERATION 408, where various signals 308 are collected and stored. For example, the signals 308 are associated with user life events and user activities, and can be collected from one or more computing devices 102, servers 106, or data sources 104.

At OPERATION 410, machine learning, statistical analysis, behavioral analytics, and data mining techniques are applied to the collected signals, and relationships between the user and the user's user activities are derived and represented in a user context graph 216.

The method 400 proceeds to OPERATION 412, where the user activities are mapped with task-related entities, and at OPERATION 414, a task item state is inferred. At DECISION OPERATION 416, a determination is made as to whether the task item 304 or the user activity for which a task reminder is set is complete or not. When the task item 304 or the user activity for which a task reminder is set is determined to not be complete, the method 400 can optionally proceed to OPERATION 418, where one or more various actions can be performed (e.g., retrigger a reminder notification to the user, persist the task item 304, share information with the digital personal assistant 206, an application 204, or a third-party system). The method 400 can then return to OPERATION 408.

When the task item 304 or the user activity for which the reminder is set is determined to be complete, the method 400 proceeds to OPERATION 420, where the task item status is updated. For example, the task item 304 can be automatically marked as complete, can be removed from a task list 302, etc., or the system 200 can stop tracking the task-related entities 306. The method 400 ends at END OPERATION 498.

Figure 5:
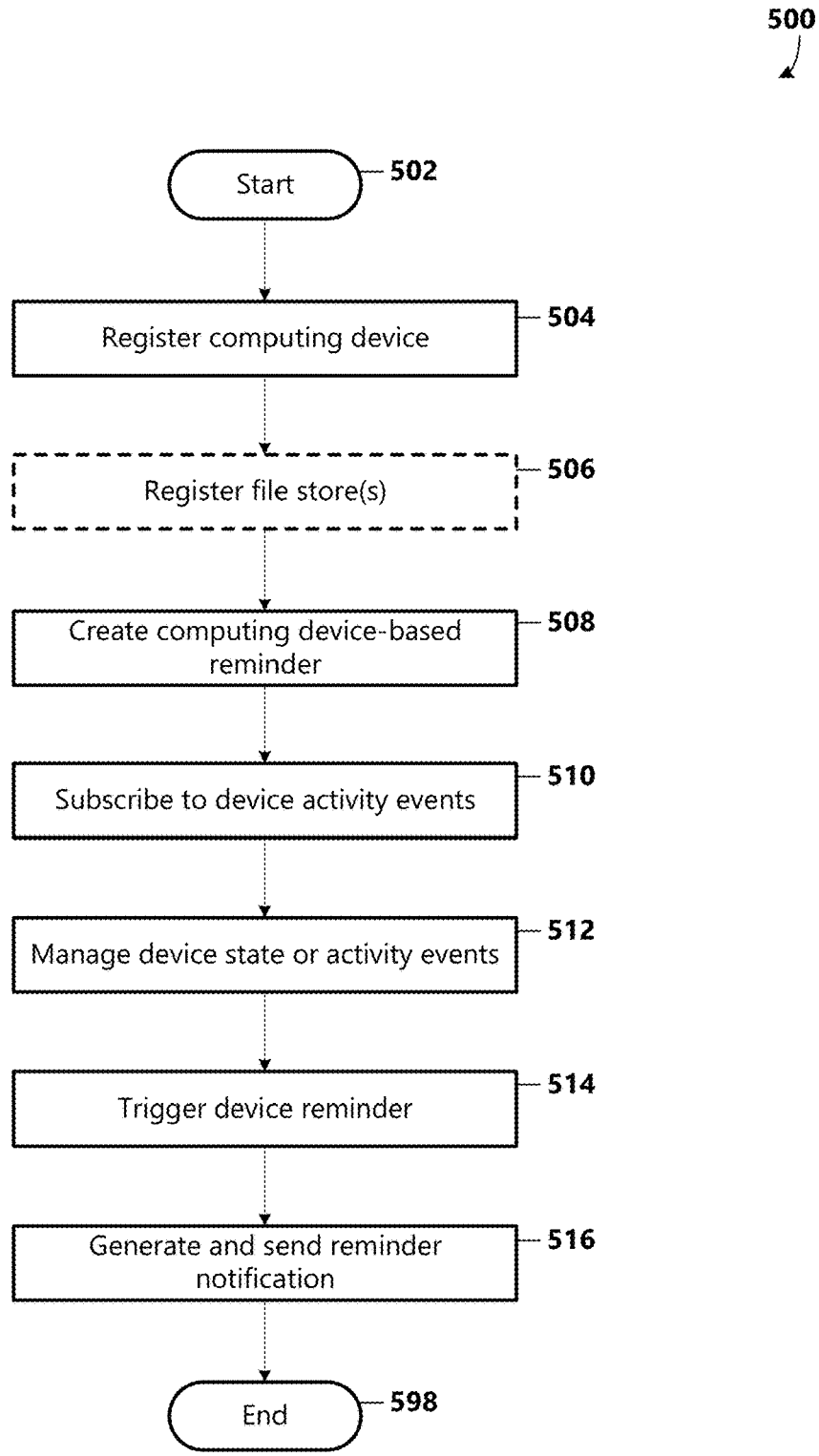
FIG. 5 is a flow chart showing general stages involved in an example method for providing computing device state or computing device, application, or file activity-based reminders.

FIG. 5 is a flow chart showing general stages involved in an example method 500 for providing computing device state or computing device, application 204, or file activity-based task reminders. With reference now to FIG. 5, the method 500 begins at start OPERATION 502, and proceeds to OPERATION 504, where a user installs a digital personal assistant 206 or signs in with an account for a digital personal assistant on any of the user's computing devices 102, and the digital personal assistant registers the user's computing device with the device registration service 234, which stores data associated with the user's computing device(s) (e.g., device ID, device type) in an encrypted user data store 214.

In some examples, the method 500 proceeds to OPERATION 506, where one or more of the user's online data store 256 accounts are registered with the account registration service 246, which authenticates (e.g., with an online data store account username and password) the one or more online data store accounts with one or more corresponding online store authentication services 254 for enabling communications with the user regarding file events on the user's files stored in the one or more online data stores.

The method 500 proceeds to OPERATION 508, where a task reminder is created via an application 204 or a digital personal assistant 206 operating on one of the user's computing devices 102. In some examples, the task item reminder is device event-based. That is, the reminder is based on the user's computing device state or computing device activity. For example, the user can speak or type a command such as "remind me to send an email to Sue when I open my Windows® PC," wherein the trigger point for the device event-based reminder is an open event activity signal from the operating system on the user's Windows® PC computing device 102. In other examples, the task item reminder is application 204 event-based. That is, the task reminder is based on opening or using an application 204 on one of the user's computing devices 102 or on a particular user computing device. For example, the user can speak or type a command such as "remind me to pay my utility bill when I open my browser," wherein the trigger point for the application event-based reminder is an open event activity signal from a browser application 204 on one of the user's computing devices 102. In other examples, the task item reminder is file event-based. That is, the task reminder is based on file activity on one of the user's computing devices 102 or on a particular user computing device. For example, the user can speak or type a command such as "remind me to delete the draft timeline sheet when I open the Project Timeline spreadsheet file," wherein the trigger point for the file event-based reminder is an open event activity signal from the file in the cloud or on one of the user's computing devices 102.

The method 500 proceeds to OPERATION 510, where the reminders service 208 subscribes to state or activity events with the reactor 218, which provides and manages one or more publish/subscribe models for state or activity events. For example, the reactor 218 can provide and manage one or more of: a publish/subscribe model for a computing device graph 235 representing computing devices 102 that the user possesses or uses, a publish/subscribe model for a device-application graph 245 representing applications 204 that the user possesses or uses the user's one or more computing devices, and a publish/subscribe model for a user file graph 255 representing the user's local and cloud-based data files.

At OPERATION 512, the reactor 218 listens for change events on one or more of: a user computing device 102 in the computing device graph 235, an application 204 in the device-application graph 245, and a user file in the user file graph 255. When an activity event corresponding to a computing device 102, application 204, and/or a user file is published to the computing device graph 235, the device-application graph 245, or the user file graph 255, the reactor notifies the reminder triggering service 220. For example, with respect the example task reminders mentioned above, the activity event can be an open event activity signal from the operating system on the user's Windows® PC computing device 102, an open event activity signal from a browser application 204 on one of the user's computing devices, or an open event activity signal from the file in the cloud or on one of the user's computing devices.

The method 500 proceeds to OPERATION 514, where a task reminder is triggered based on the activity event. At OPERATION 516, task reminder data is fetched from the user data store 214, and a task reminder notification is generated and sent to the user on the computing device 102 being used by the user or on a companion device. Accordingly, the user is reminded about the task-related activity associated with the computing device 102 activity event, application 204 activity event, or the user file activity event based on the task reminder payload. The method 500 ends at OPERATION 598.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
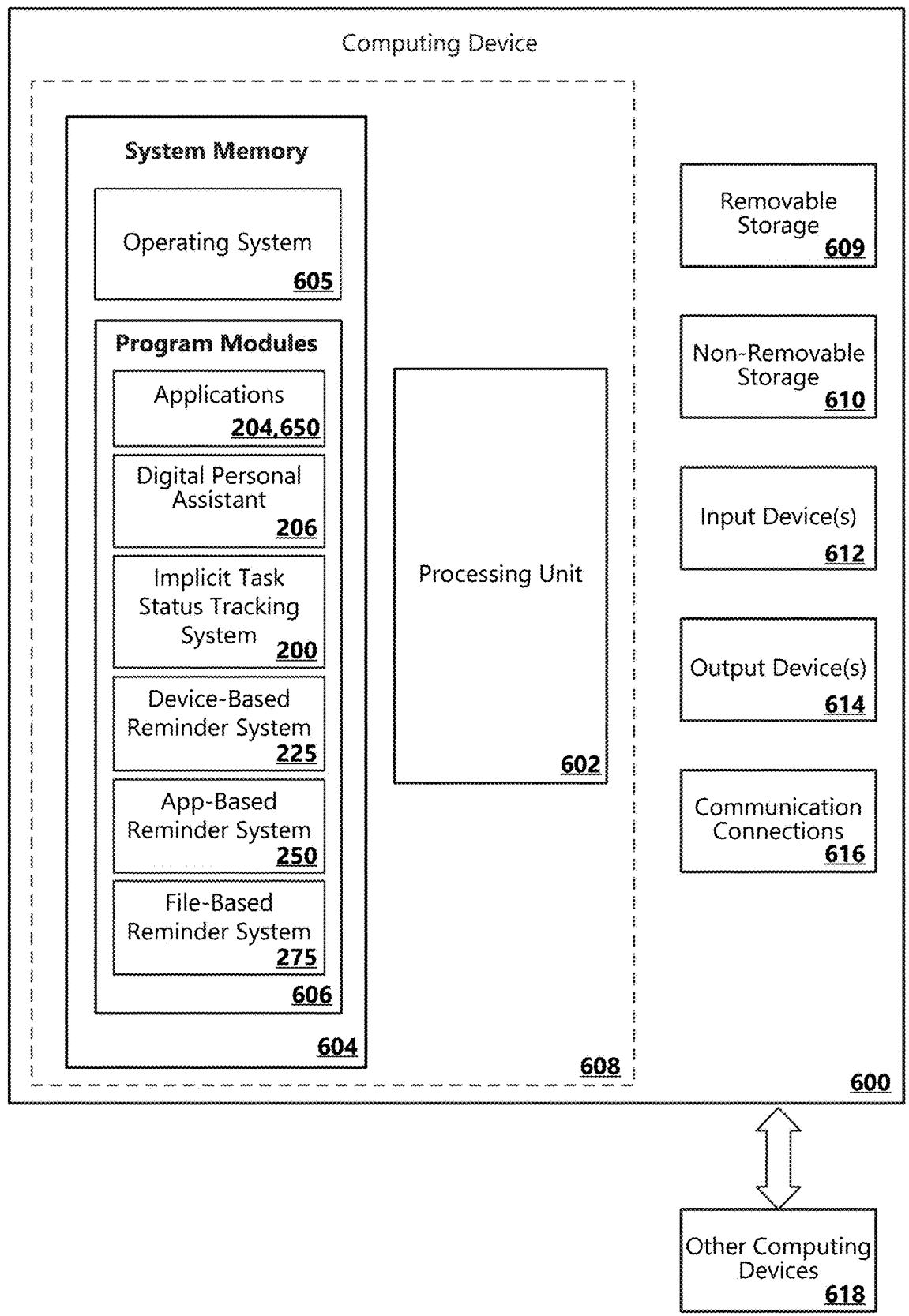
FIG. 6 is a block diagram illustrating example physical components of a computing device.
Figure 7A:
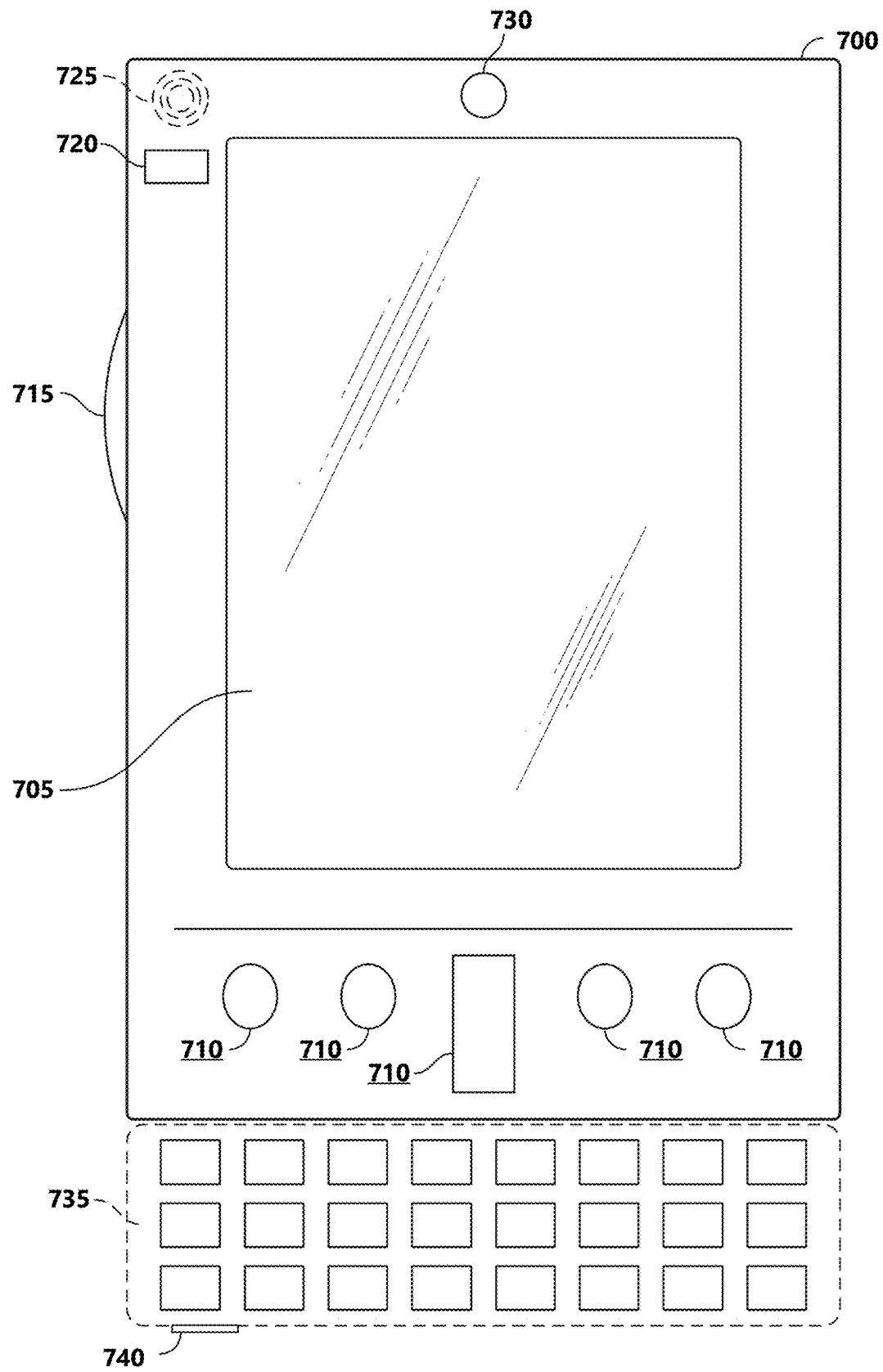
FIGS. 7A and 7B are simplified block diagrams of a mobile computing device.
Figure 7B:
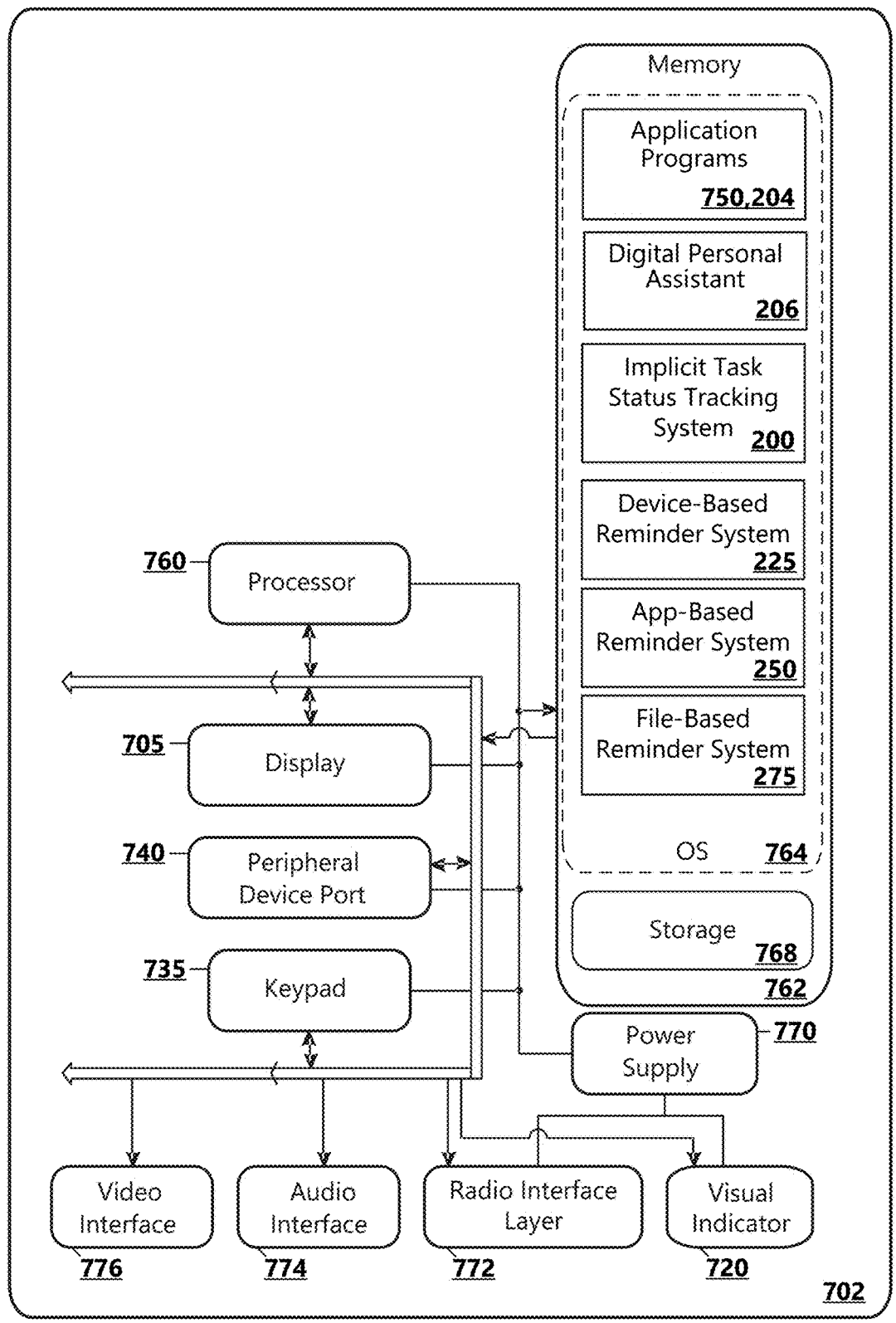
Figure 8:
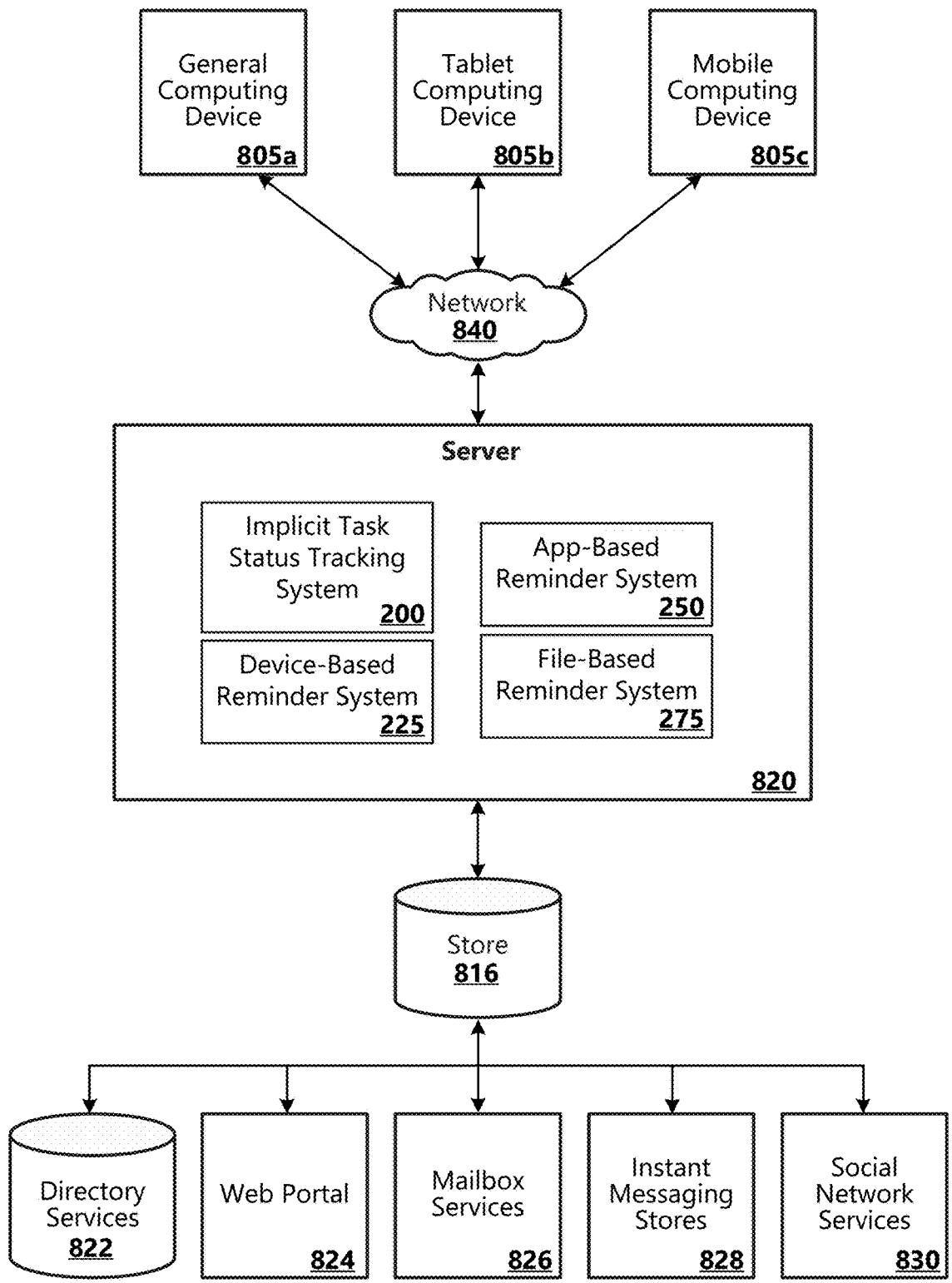
FIG. 8 is a simplified block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are used for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650,204. According to an aspect, the system memory 604 includes the digital personal assistant 206. According to another aspect, the system memory 604 includes one or more components of the example systems 200, 225, 250, and 275. The operating system 605, for example, is suitable for controlling the operation of the computing device 600. Furthermore, aspects are practiced in conjunction with a graphics library, other operating systems, or any other application program, and is not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., application 204, digital personal assistant 206, one or more components of the example systems 200, 225, 250, 275) perform processes including, but not limited to, one or more of the stages of the method 400 illustrated in FIG. 4 and one or more stages of the method 500 illustrated in FIG. 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750,204 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the digital personal assistant 206 is loaded into the memory 762 and run on or in association with the operating system 764. According to another aspect, one or more components of the example systems 200, 225, 250, 275 are loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768. According to an aspect, data/information generated or captured by the mobile computing device 700 and stored via the system 702 is stored locally on the mobile computing device 700, as described above. According to another aspect, the data is stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for providing computing device state or activity based task reminders and automatic tracking of statuses of task-related activities as described above. Content developed, interacted with, or edited in association with the one or more components of the example systems 200, 225, 250, 275 are enabled to be stored in different communication channels or other storage types. For example, various documents may be stored using a directory service 822, a web portal 824, a mailbox service 826, an instant messaging store 828, or a social networking site 830. One or more components of the example systems 200, 225, 250, 275 are operative or configured to use any of these types of systems or the like for providing computing device state or activity based task reminders and automatic tracking of statuses of task-related activities, as described herein. According to an aspect, a server 820 provides the one or more components of the example systems 200, 225, 250, 275 to client computing devices 805a,b,c. As one example, the server 820 is a web server providing one or more components of the example systems 200, 225, 250, 275 over the web. The server 820 provides one or more components of the example systems 200, 225, 250, 275 over the web to clients 805 through a network 840. By way of example, the computing device is implemented and embodied in a personal computer computing device 805a, a tablet computing device 805b or a mobile computing device 805c (e.g., a smart phone), or other computing device. Any of these examples of the computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for managing a task list comprising user tasks associated with a user, the system comprising:
at least one processing device;
a data store; and
at least one computer readable data storage device storing instructions that, when executed by the at least one processing device, cause the system to:
receive a payload of task item data associated with a user task in the task list, wherein the user task is an implicit task;
identify and extract one or more task-related entities in the payload;
collect a plurality of user signals by way of one or more sensors integrated with or communicatively attached to at least a user device associated with the user;

analyze the plurality of user signals to identify user activities associated with the plurality of user signals;

generate, using a mapping engine, a user context graph that indicates relationships between the task-related entities and the user activities, wherein the mapping engine and user context graph support identifying implicit tasks and completion of implicit tasks based on machine learning inferences associated with the user context graph, wherein the machine learning inferences include each of the following:
- an inferred status of an explicit task and
- an inferred status of the implicit task;

receive, from the user device, a signal communicating an occurrence of an event detected at the user device, the event comprising a computer device state event, a computer device geo-location event, a computer application event, or a computer file event;

determine that the event is a triggering event related to the user task in the task list, based at least in part on the user context graph;

in response to the triggering event, cause a notification to be provided via a visual output component of the user device to automatically update the task list to indicate a state of the user task; and automatically update the data store to reflect a change in the state of the user task, based at least in part on tracking one or more user activities.

2. The system of claim 1, wherein the instructions that, when executed by the at least one processing device, further cause the system to determine a match between a task-related entity of the one or more task-related entities and an entity of the user activities.

3. The system of claim 2, wherein the instructions that, when executed by the at least one processing device, further cause the system to infer the state of the user task based on a score from a machine learning process for determining the match between the task-related entity and a user activity.

4. The system of claim 3, wherein the score is indicative of:
- a likelihood that the user activity is related to completing an action associated with the user task; or
- a likelihood that the user task has been completed.

5. The system of claim 1, wherein the instructions that, when executed by the at least one processing device, further cause the system to collect the plurality of user signals, the plurality of user signals comprise at least one of:
- user's geo-location;
- time and date information;
- communications;
- network connection information;
- browsing history;
- search history;
- application usage information; and
- computing device usage information.

6. The system of claim 1, wherein the instructions that, when executed by the at least one processing device, further cause the system to communicate the state of the user task to at least one of:
- a digital personal assistant;
- an application; or
- a third-party system.

7. The system of claim 1, wherein the triggering event comprises receiving an emailed receipt related to an user activity, wherein the instructions that, when executed by the at least one processing device, further cause the system to infer that the user task has been completed based on a connection in the user context graph between the user activity and at least one of the one or more task-related entities.

8. The system of claim 1, wherein the instructions that, when executed by the at least one processing device, further cause the system to cease tracking the user task based on the state of the user task, or cause the system to persist the state of the user task as an uncompleted state, wherein the machine learning inference of the inferred status is based on signals collected from one or more sources of user data comprising at least one of location data, communication data, browsing history, web search history, application usage, or device usage.

9. The system of claim 1, wherein the inferred status of the implicit task or the inferred status of the explicit task supports status tracking operations corresponding to a completed, not completed, or in-progress state of the implicit task or explicit task.

10. The system of claim 9, wherein the instructions that, when executed by the at least one processing device, further cause the system to communicate the state of the user task to at least one of:
- a digital personal assistant;
- an application; or
- a third-party system.

11. The system of claim 1, the event comprising the computer device state event, the computer device geo-location event, the computer application event, the computer file event, an operating system event, a date, a time, presence status, or a user interaction with a contact.

12. A system for managing a task list comprising user tasks associated with a user, the system comprising:
- at least one processing device;
- a data store; and
- at least one computer readable data storage device storing instructions that, when executed by the at least one processing device, cause the system to:
  - register identification information for one or more computing devices associated with the user;
  - receive a payload of task item data associated with a user task in the task list, the task item data comprising user-set reminder parameters, wherein the user task is an implicit task;
  - collect a plurality of user signals by way of one or more sensors integrated with or communicatively attached to at least a user device associated with the user;
  - analyze the plurality of user signals to identify user activities associated with the plurality of user signals;
  - generate, using a mapping engine, a user context graph to connect the user-set reminder parameters to the user activities, wherein the mapping engine and user context graph support identifying implicit tasks and completion of implicit tasks based on machine learning inferences associated with the user context graph, wherein the machine learning inferences include each of the following:
    - an inferred status of an explicit task and
    - an inferred status of the implicit task;
  - identify a change event associated with the user-set reminder parameters on the user context graph;
  - receive, from the user device, a signal communicating an occurrence of an event detected at the user device, the event comprising a computer device state event, a computer device geo-location event, a computer application event, or a computer file event;

determine that the event corresponds to an occurrence of the change event, based at least in part on the user context graph;

responsive to the occurrence of the change event associated with the user-set reminder parameters, cause a notification to be presented via a visual output component at one of the user's registered computing devices to automatically update the task list to indicate a state of the user task; and automatically update the data store to reflect a change in the state of the user task, based at least in part on tracking one or more user activities.

13. The system of claim 12, wherein the instructions that, when executed by the at least one processing device, further cause the system to:

provide a publish-subscribe model for the user context graph; and subscribe to the change event based on the user-set reminder parameters, the change event comprising at least one of:

a computer device activity-related event, an application activity-related event, or a user file activity-related event.

14. The system of claim 13, wherein the computer device activity-related event comprises:

a boot event;

an open event;

a close event;

a sleep event; or a shut down event.

15. The system of claim 13, wherein the application activity-related event comprises:

an open application event;

a close application event;

a kill application event; or an uninstall application event.

16. The system of claim 13, wherein the user file activity-related event comprises:

an open file event;

an edit file event;

a close file event;

a delete file event; or a move file event.

17. A computer-implemented method for managing a task list comprising user tasks associated with a user, the method comprising:

receiving a payload of task item data associated with a user task in the task list, the task item data comprising reminder parameters associated with an agent, the agent comprising a computing device associated with the user, an application on the computing device associated with the user, a user file stored on the computing device associated with the user, or a user file stored in an online data store, wherein the user task is an implicit task;

identifying and extracting one or more task-related entities in the payload;

collect a plurality of signals associated with activities on the agent;

analyze the plurality of signals to identify the activities;

generating, using a mapping engine, a context graph with a structured schematic representing relationships of the reminder parameters and the signals on the agent, wherein the mapping engine and user context graph support identifying implicit tasks and completion of implicit tasks based on machine learning inferences associated with the user context graph, wherein the machine learning inferences include each of the following:

an inferred status of an explicit task and an inferred status of the implicit task;

receiving a signal communicating an occurrence of an event detected at the agent, the event comprising a computer device state event, a computer device geo-location event, a computer application event, or a computer file event;

detecting a change event associated with the reminder parameters on the context graph, wherein the change event is identified based at least in part on the signal and the structured schematic;

responsive to the detection of the change event associated with the reminder parameters, causing a notification to be presented via a visual output component at the computing device associated with the user to automatically update the task list to indicate a state of the user task; and automatically updating the task item data to reflect a change in the state of the user task, based at least in part on tracking one or more activities.

18. The method of claim 17, wherein listening for the change event comprises:

subscribing to the change event on a publish-subscribe model, wherein the change event comprises at least one of:

a computer device activity-related event, an application activity-related event, or a user file activity-related event.

19. The method of claim 17, further comprising:

communicating the state of the user task to a digital personal assistant.

20. The method of claim 19, further comprising:

determining the state of the user task being complete or incomplete; and persisting the state of the user task based on the state of the user task.

* * * * *